(12) United States Patent
Schobeiri et al.

(10) Patent No.: US 10,740,795 B2
(45) Date of Patent: Aug. 11, 2020

(54) SYSTEMS, METHODS, AND DEVICES FOR DECREASING LATENCY AND/OR PREVENTING DATA LEAKAGE DUE TO ADVERTISEMENT INSERTION

(71) Applicant: MediaMath, Inc., New York, NY (US)

(72) Inventors: Wilfried A. Schobeiri, Chicago, IL (US); Michael K. Lamb, Brooklyn, NY (US)

(73) Assignee: MediaMath, Inc., New York, NY (US)

(*) Notice: Subject to any disclaimer, the term of this patent is extended or adjusted under 35 U.S.C. 154(b) by 0 days.

(21) Appl. No.: 16/425,502

(22) Filed: May 29, 2019

(65) Prior Publication Data

US 2019/0347693 A1 Nov. 14, 2019

Related U.S. Application Data

(63) Continuation of application No. 15/981,401, filed on May 16, 2018, now Pat. No. 10,354,276.

(Continued)

(51) Int. Cl.
*G06Q 30/00* (2012.01)
*G06Q 30/02* (2012.01)
*G06F 21/62* (2013.01)

(52) U.S. Cl.
CPC ..... *G06Q 30/0257* (2013.01); *G06F 21/6263* (2013.01); *G06Q 30/0275* (2013.01)

(58) Field of Classification Search
None
See application file for complete search history.

(56) References Cited

U.S. PATENT DOCUMENTS

| 5,923,902 A | 7/1999 | Inagaki |
| 5,983,227 A | 11/1999 | Nazem et al. |

(Continued)

FOREIGN PATENT DOCUMENTS

| WO | WO 2005/094175 | 10/2005 |
| WO | WO 2009/078861 | 6/2009 |
| WO | WO 2012/167209 | 12/2012 |

OTHER PUBLICATIONS

"Online Customized Ads Move a Step Closer" printed Sep. 6, 2007.

(Continued)

*Primary Examiner* — Michael W Schmucker
(74) *Attorney, Agent, or Firm* — Knobbe, Martens, Olson & Bear, LLP

(57) ABSTRACT

The disclosure herein relates to systems, methods, and devices for decreasing latency and/or preventing data leakage that may arise from advertisement insertion. In some embodiments, the systems, methods, and devices described herein provide for asynchronous advertisement selection and/or insertion separate from user-requested content retrieval and/or delivery, wherein the advertisement selection can be performed in parallel with and/or at a separate location from the user-requested content retrieval and/or delivery, thereby decreasing latency in rendering user-requested content. Further, in certain embodiments, the systems, methods, and devices described herein can prevent data leakage by preventing and/or circumventing the need to use cookie syncing among different DSPs, SSPs, or the like. Moreover, in some embodiments, the systems, methods, and devices described herein are configured to deliver advertisements as a native content, thereby further decreasing latency and/or preventing data leakage.

17 Claims, 9 Drawing Sheets

Related U.S. Application Data

(60) Provisional application No. 62/507,436, filed on May 17, 2017.

(56) References Cited

U.S. PATENT DOCUMENTS

| | | |
|---|---|---|
| 6,269,361 B1 | 7/2001 | Davis et al. |
| 6,285,983 B1 | 9/2001 | Jenkins |
| 6,327,574 B1 | 12/2001 | Kramer et al. |
| 6,430,539 B1 | 8/2002 | Lazarus et al. |
| 6,766,327 B2 | 7/2004 | Morgan et al. |
| 6,938,022 B1 | 8/2005 | Singhal |
| 6,941,376 B2 | 9/2005 | Mitchell et al. |
| 6,974,078 B1 | 12/2005 | Simon |
| 7,013,290 B2 | 3/2006 | Ananian |
| 7,069,256 B1 | 6/2006 | Campos |
| 7,139,723 B2 | 11/2006 | Conkwright et al. |
| 7,146,329 B2 | 12/2006 | Conkwright et al. |
| 7,197,472 B2 | 3/2007 | Conkwright et al. |
| 7,197,568 B2 | 3/2007 | Boure et al. |
| 7,203,909 B1 | 4/2007 | Horvitz |
| 7,219,078 B2 | 5/2007 | Lamont et al. |
| 7,236,941 B2 | 6/2007 | Conkwright et al. |
| 7,257,546 B2 | 8/2007 | Ebrahimi et al. |
| 7,523,087 B1 | 4/2009 | Agarwal et al. |
| 7,630,986 B1 | 12/2009 | Herz et al. |
| 7,685,232 B2 | 3/2010 | Gibbs et al. |
| 7,792,697 B2 | 9/2010 | Bhagchandani et al. |
| 7,805,332 B2 | 9/2010 | Wilson |
| 7,840,438 B2 | 11/2010 | Carson et al. |
| 7,848,950 B2 | 12/2010 | Herman et al. |
| 7,860,743 B2 | 12/2010 | Stevens |
| 8,001,004 B2 | 8/2011 | Protheroe et al. |
| 8,086,697 B2 | 12/2011 | Goulden et al. |
| 8,108,254 B2 | 1/2012 | Lin et al. |
| 8,117,067 B2 | 2/2012 | Ketchum |
| 8,117,199 B2 | 2/2012 | Ghani et al. |
| 8,160,977 B2 | 4/2012 | Poulin |
| 8,175,950 B1 | 5/2012 | Grebeck et al. |
| 8,255,285 B1 | 8/2012 | Peretz et al. |
| 8,255,489 B2 | 8/2012 | Agergan et al. |
| 8,375,046 B2 | 2/2013 | Dettinger et al. |
| 8,527,342 B2 | 9/2013 | Feuerstein et al. |
| 8,548,909 B1 | 10/2013 | Snow et al. |
| 8,688,522 B2 | 4/2014 | Gern et al. |
| 8,782,249 B1 | 7/2014 | Hood |
| 8,972,530 B2 | 3/2015 | Agergan et al. |
| 9,076,166 B1 | 7/2015 | Peretz et al. |
| 9,135,655 B2 | 9/2015 | Buchalter et al. |
| 9,497,496 B1 | 11/2016 | Corley et al. |
| 10,223,703 B2 | 3/2019 | Buchalter et al. |
| 10,332,156 B2 | 6/2019 | Buchalter et al. |
| 10,354,276 B2 | 7/2019 | Schobeiri et al. |
| 10,467,659 B2 | 11/2019 | Chalasani et al. |
| 10,592,910 B2 | 3/2020 | Buchalter |
| 10,628,859 B2 | 4/2020 | Buchalter et al. |
| 10,636,060 B2 | 4/2020 | Buchalter et al. |
| 2001/0037361 A1 | 11/2001 | Croy |
| 2001/0049620 A1 | 12/2001 | Blasko |
| 2001/0053995 A1 | 12/2001 | Nishimoto |
| 2002/0052825 A1 | 5/2002 | Bensemana |
| 2002/0055880 A1 | 5/2002 | Unold et al. |
| 2002/0065797 A1 | 5/2002 | Meidan et al. |
| 2002/0087573 A1 | 7/2002 | Reuning et al. |
| 2002/0087967 A1 | 7/2002 | Conkwright et al. |
| 2002/0103698 A1 | 8/2002 | Cantrell |
| 2002/0116491 A1 | 8/2002 | Boyd et al. |
| 2002/0133490 A1 | 9/2002 | Conkwright et al. |
| 2002/0188508 A1 | 12/2002 | Lee et al. |
| 2002/0194434 A1 | 12/2002 | Kurasugi |
| 2003/0018550 A1 | 1/2003 | Rotman et al. |
| 2003/0023489 A1 | 1/2003 | McGuire et al. |
| 2003/0033202 A1 | 2/2003 | Ogawa et al. |
| 2003/0101454 A1 | 5/2003 | Ozer et al. |
| 2003/0135464 A1 | 7/2003 | Mourad et al. |
| 2003/0149622 A1 | 8/2003 | Singh et al. |
| 2003/0208754 A1 | 11/2003 | Sridhar et al. |
| 2004/0054589 A1 | 3/2004 | Nicholas et al. |
| 2004/0073553 A1 | 4/2004 | Brown et al. |
| 2004/0083133 A1 | 4/2004 | Nicholas et al. |
| 2004/0123247 A1 | 6/2004 | Wachen et al. |
| 2004/0215501 A1 | 10/2004 | D'ornano |
| 2004/0225562 A1 | 11/2004 | Turner |
| 2005/0038700 A1 | 2/2005 | Doemling et al. |
| 2005/0105513 A1 | 5/2005 | Sullivan et al. |
| 2005/0125289 A1 | 6/2005 | Beyda et al. |
| 2005/0144065 A1 | 6/2005 | Calabria et al. |
| 2005/0144072 A1 | 6/2005 | Perkowski et al. |
| 2005/0144073 A1 | 6/2005 | Morrisroe et al. |
| 2005/0159921 A1 | 7/2005 | Lourviere et al. |
| 2005/0171843 A1 | 8/2005 | Brazell et al. |
| 2005/0188400 A1 | 8/2005 | Topel |
| 2005/0197954 A1 | 9/2005 | Maitland et al. |
| 2005/0216339 A1 | 9/2005 | Brazell et al. |
| 2005/0235030 A1 | 10/2005 | Lauckhart et al. |
| 2005/0251444 A1 | 11/2005 | Varian et al. |
| 2005/0261062 A1 | 11/2005 | Lewin |
| 2005/0273388 A1 | 12/2005 | Roetter |
| 2006/0026067 A1 | 2/2006 | Nicholas et al. |
| 2006/0031301 A1 | 2/2006 | Herz et al. |
| 2006/0041661 A1 | 2/2006 | Erikson et al. |
| 2006/0128469 A1 | 6/2006 | Willis et al. |
| 2006/0212350 A1 | 9/2006 | Ellis et al. |
| 2006/0224447 A1 | 10/2006 | Koningstein |
| 2006/0253323 A1 | 11/2006 | Phan et al. |
| 2007/0033105 A1 | 2/2007 | Collins et al. |
| 2007/0033269 A1 | 2/2007 | Atkinson et al. |
| 2007/0033532 A1 | 2/2007 | Lemelson |
| 2007/0050244 A1 | 3/2007 | Stevens |
| 2007/0061195 A1 | 3/2007 | Liu et al. |
| 2007/0118796 A1 | 5/2007 | Nazem et al. |
| 2007/0143171 A1 | 6/2007 | Boyd et al. |
| 2007/0150353 A1 | 6/2007 | Krassner et al. |
| 2007/0156524 A1 | 7/2007 | Grouf et al. |
| 2007/0157245 A1 | 7/2007 | Collins |
| 2007/0192356 A1 | 8/2007 | O'Kelley |
| 2007/0198350 A1 | 8/2007 | O'Kelley et al. |
| 2007/0214037 A1 | 9/2007 | Shubert et al. |
| 2007/0265923 A1 | 11/2007 | Krassner et al. |
| 2007/0271392 A1 | 11/2007 | Khopkar et al. |
| 2007/0271501 A1 | 11/2007 | Vasilik |
| 2007/0271511 A1 | 11/2007 | Khopkar et al. |
| 2008/0004954 A1 | 1/2008 | Horvitz |
| 2008/0021778 A1 | 1/2008 | Perkowski et al. |
| 2008/0052278 A1 | 2/2008 | Zlotin et al. |
| 2008/0052413 A1 | 2/2008 | Wang et al. |
| 2008/0097832 A1 | 4/2008 | Lee et al. |
| 2008/0103799 A1 | 5/2008 | Domenikos et al. |
| 2008/0103800 A1 | 5/2008 | Domenikos et al. |
| 2008/0103895 A1 | 5/2008 | Burdick et al. |
| 2008/0109376 A1 | 5/2008 | Walsh et al. |
| 2008/0162574 A1 | 7/2008 | Gilbert |
| 2008/0189175 A1 | 8/2008 | Chan |
| 2008/0249855 A1 | 10/2008 | Collins et al. |
| 2008/0255922 A1 | 10/2008 | Feldman et al. |
| 2008/0256061 A1 | 10/2008 | Chang et al. |
| 2008/0262907 A1 | 10/2008 | Broady et al. |
| 2008/0275757 A1 | 11/2008 | Sharma et al. |
| 2008/0313027 A1 | 12/2008 | Jain et al. |
| 2009/0002852 A1 | 1/2009 | Wang |
| 2009/0012852 A1 | 1/2009 | O'Kelley et al. |
| 2009/0063250 A1 | 3/2009 | Burgess |
| 2009/0083145 A1 | 3/2009 | Lee |
| 2009/0098891 A1 | 4/2009 | Park et al. |
| 2009/0112629 A1 | 4/2009 | Leiper |
| 2009/0150362 A1 | 6/2009 | Evenhaim |
| 2009/0216619 A1 | 8/2009 | Tavernier |
| 2009/0228397 A1 | 9/2009 | Tawakol et al. |
| 2009/0327006 A1 | 12/2009 | Hansan |
| 2010/0023863 A1 | 1/2010 | Cohen-Martin |
| 2010/0042497 A1 | 2/2010 | Pritchard et al. |
| 2010/0049602 A1 | 2/2010 | Softky |
| 2010/0070322 A1 | 3/2010 | Lahaie et al. |
| 2010/0082402 A1 | 4/2010 | Kantak et al. |
| 2010/0082429 A1 | 4/2010 | Samdadiya et al. |

(56) References Cited

U.S. PATENT DOCUMENTS

| | | |
|---|---|---|
| 2010/0100407 A1 | 4/2010 | Lin et al. |
| 2010/0114716 A1 | 5/2010 | Heilig et al. |
| 2010/0145763 A1 | 6/2010 | Swanson |
| 2010/0185516 A1 | 7/2010 | Swanson et al. |
| 2010/0191558 A1 | 7/2010 | Chickering et al. |
| 2010/0228634 A1 | 9/2010 | Ghosh et al. |
| 2010/0268603 A1 | 10/2010 | Nolet et al. |
| 2011/0035259 A1 | 2/2011 | Das et al. |
| 2011/0035287 A1 | 2/2011 | Fox |
| 2011/0055009 A1 | 3/2011 | Kiversis |
| 2011/0078143 A1 | 3/2011 | Aggarwal |
| 2011/0119125 A1 | 5/2011 | Javangula et al. |
| 2011/0145570 A1 | 6/2011 | Gressel et al. |
| 2011/0191714 A1 | 8/2011 | Ting et al. |
| 2011/0213659 A1 | 9/2011 | Fontoura et al. |
| 2011/0225037 A1 | 9/2011 | Tunca et al. |
| 2011/0231264 A1 | 9/2011 | Dilling et al. |
| 2011/0246298 A1 | 10/2011 | Williams et al. |
| 2011/0246310 A1 | 10/2011 | Buchalter et al. |
| 2011/0251875 A1 | 10/2011 | Cosman |
| 2011/0276389 A1 | 11/2011 | Kulkarni et al. |
| 2011/0313757 A1 | 12/2011 | Hoover et al. |
| 2012/0129525 A1 | 5/2012 | Pazhyannur et al. |
| 2012/0021507 A1 | 8/2012 | Brereton, II et al. |
| 2012/0226560 A1 | 9/2012 | Chang et al. |
| 2012/0253928 A1 | 10/2012 | Jackson et al. |
| 2012/0323674 A1 | 12/2012 | Simmons et al. |
| 2013/0124316 A1 | 5/2013 | Kiversis |
| 2013/0124669 A1 | 5/2013 | Anderson et al. |
| 2013/0185039 A1 | 7/2013 | Tesauro et al. |
| 2013/0276009 A1 | 10/2013 | Ajitomi et al. |
| 2013/0346597 A1 | 12/2013 | Baumback et al. |
| 2014/0082660 A1 | 3/2014 | Zhang et al. |
| 2014/0108139 A1 | 4/2014 | Weinstein |
| 2014/0143032 A1 | 5/2014 | Tomlin et al. |
| 2014/0222593 A1 | 8/2014 | Cosman |
| 2015/0066793 A1 | 3/2015 | Brown |
| 2015/0193818 A1* | 7/2015 | Turner .................. G06F 40/186 705/14.49 |
| 2015/0242379 A1 | 8/2015 | Kuivinen et al. |
| 2015/0347353 A1 | 12/2015 | Turner et al. |
| 2016/0170567 A1 | 6/2016 | Hunter et al. |
| 2016/0316240 A1* | 10/2016 | Hirsch .................. H04L 65/604 |
| 2017/0330245 A1 | 11/2017 | Guermas et al. |
| 2018/0040032 A1 | 2/2018 | Chalasani et al. |
| 2019/0205900 A1 | 7/2019 | Buchalter |
| 2019/0244257 A1 | 8/2019 | Goldman et al. |
| 2019/0340655 A1 | 11/2019 | Buchalter et al. |
| 2019/0347697 A1 | 11/2019 | Chalasani et al. |

OTHER PUBLICATIONS

"Yahoo New "SmartAds" Meld Brand and Direct Response Advertising" printed Sep. 6, 2007.

"Yahoo Smart Ads Demo Page" printed Sep. 6, 2007.

Abacus Selects MicroStrategy for Enhanced Marketing Campaign Reporting and Analysis, PRNewswire, Mar. 1, 2006, Retrieved from: http://prnewswire.com/news-releases/abacus-selects-microstrategy-for-enhanced-marketing-campaign-reporting-and-analysis-55192512.html (1 page).

Chen, M., et al., Mining changes in customer behavior in retail marketing, 2005, pp. 773-781, Expert Systems with Application, vol. 28, 9 pages.

Eric W. Tyree et al, Bankruptcy prediction models: probabilistic neural networks versus discriminant analysis and backpropagation neural networks, 1996.

EP Extended Search Report for Application No. 11713434.6 dated Feb. 24, 2014.

Fu, A., et al., Privacy-Preserving Frequent Pattern Mining Across Private Databases, 2005, Proceeding of the Fifth IEEE International Conference on Data Mining, 4 Pages.

International Preliminary Report on Patentability dated Jan. 31, 2013 in PCT Application No. PCT/US2011/044386.

International Search Report and Written Opinion dated Jan. 27, 2012 in PCT Application No. PCT/US2011/030587.

International Search Report and Written Opinion dated Jan. 9, 2012 in PCT Application No. PCT/US2011/044386.

International Search Report and Written Opinion dated Feb. 24, 2014 in PCT Application No. PCT/US13/67330.

International Search Report and Written Opinion PCT/US11/43231 dated Jan. 19, 2012.

Privacy Preserving Data Mining Biography, Retrieved from: http://www.cs.umbc.edu/-kunliu1/research/privacy_review.html (12 pages).

Sammy, Ryan, Google's New Beta PPC Service Dubbed Remarketing, retrieved from internet: www.searchenginejournal.com/google%E2%80%99s-new-beta-ppc-service-dubbed-remarketing/18900/ (posted on Mar. 17, 2010).

Seufert, Eric, Measuring advertising incrementality using Ghost Ads, 2014 (Year: 2014).

University of Colorado Boulder Web Central, Expandable Content Sample, Apr. 4, 2016, (https://www.colorado.edu/webcentral/web-express-features/site-building-snap/expandable-content-sample (Year: 2016).

Wikipedia contributors. "Conditional probability distribution." Wikipedia, The Free Encyclopedia, Mar. 10, 2016 Web. Mar. 30, 2016.

Wikipedia contributors. "Posterior probability." Wikipedia, The Free Encyclopedia. Wikipedia, The Free Encyclopedia, Mar. 9, 2016. Web. Mar. 30, 2016.

Wikipedia contributors. "Probability distribution." Wikipedia, The Free Encyclopedia. Wikipedia, The Free Encyclopedia, Mar. 28, 2016. Web. Mar. 30, 2016.

Wikipedia contributors. "Stepwise regression." Wikipedia, The Free Encyclopedia. Wikipedia, The Free Encyclopedia, Mar. 19, 2016. Web. Mar. 30, 2016.

Xiong, L., et al., k Nearest Neighbor Classification across Multiple Private Databases, Nov. 5-11, 2006, CIKM'06, 2 pages.

* cited by examiner

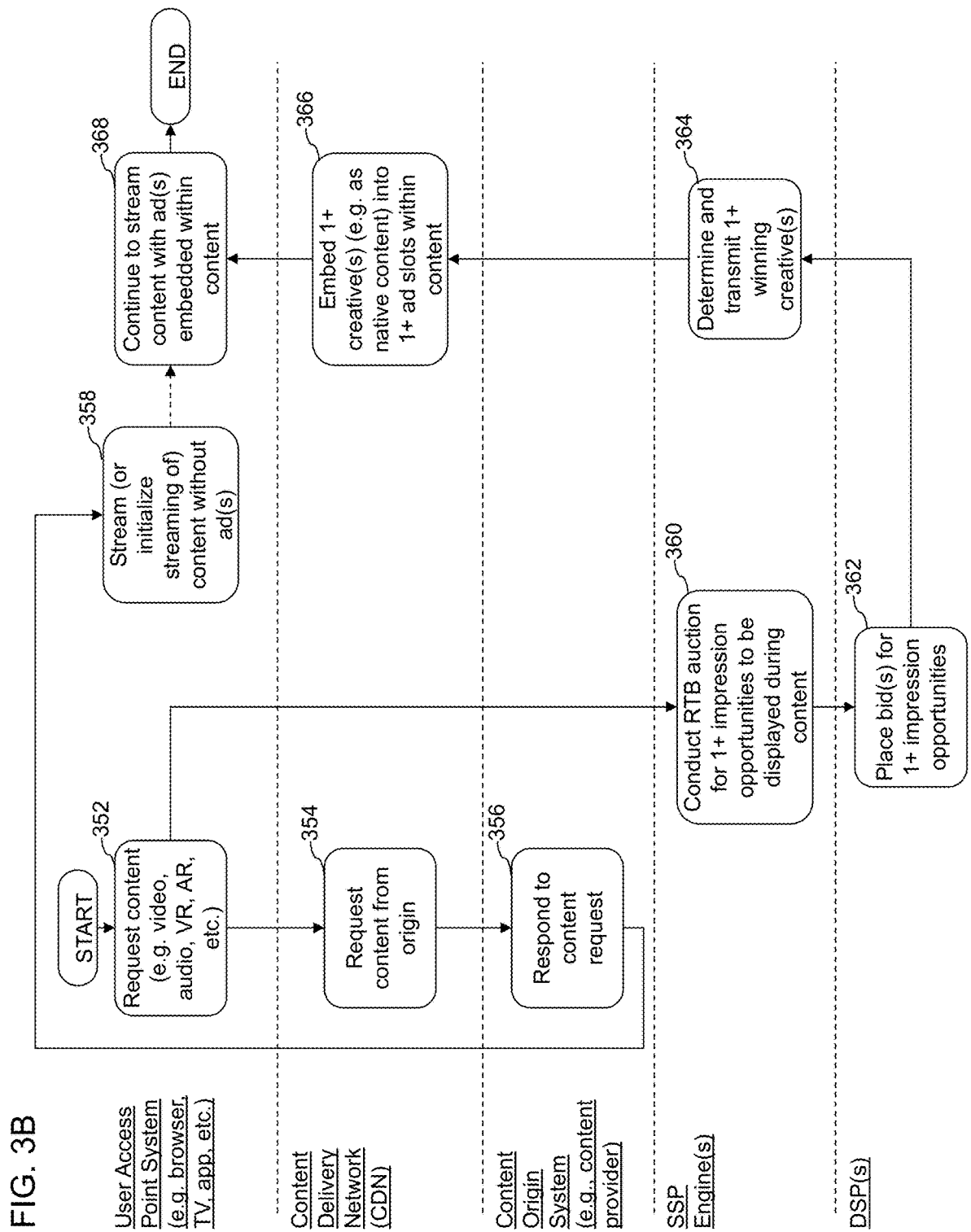

SYSTEMS, METHODS, AND DEVICES FOR DECREASING LATENCY AND/OR PREVENTING DATA LEAKAGE DUE TO ADVERTISEMENT INSERTION

CROSS-REFERENCE TO RELATED APPLICATIONS

The present application is a continuation application of U.S. patent application Ser. No. 15/981,401, filed May 16, 2018, which claims the benefit under 35 U.S.C. § 119(c) of U.S. Provisional Patent Application No. 62/507,436, filed May 17, 2017. Each of the foregoing applications is incorporated herein by reference in its entirety under 37 C.F.R. § 1.57. Any and all applications for which a foreign or domestic priority claim is identified in the Application Data Sheet as filed with the present application are hereby incorporated by reference under 37 C.F.R. § 1.57.

BACKGROUND

Field

The present application relates to information and communication technology (ICT), and in particular to online advertising, targeted advertising, and delivery thereof.

Description

Online advertising can refer to a form of marketing and advertising which uses the Internet to deliver promotional marketing messages to consumers. Online advertising can be targeted to a particular audience, for example with certain traits based on a product the advertiser is promoting. Such traits can be demographic-based, psychographic-based, and/or behavioral-based. Further, targeted advertising can be delivered on one or more platforms, such as the Internet, on-demand television, streaming video or audio content, Internet Protocol television, over-the-top media, and/or the like.

SUMMARY

Various embodiments described herein relate to systems, methods, and devices for minimizing latency of ad insertion and/or preventing data leakage. In some embodiments, a system for reducing latency in rendering user-requested content on a user access point system comprises: one or more computer readable storage devices configured to store a plurality of computer executable instructions; and one or more hardware computer processors in communication with the one or more computer readable storage devices and configured to execute the plurality of computer executable instructions in order to cause the system to: receive a request from a user access point system and/or a content origin system to transmit user-requested content to the user access point system; transmit the user-requested content to the user access point system, wherein the user-requested content comprises one or more placeholders for one or more user-targeted advertisements, thereby allowing the user access point system to render the user-requested content without the one or more user-targeted advertisements; initiate an advertisement selection process for determining the one or more user-targeted advertisements for placement in the user-requested content, wherein the advertisement selection process is processed asynchronously and in parallel to the transmission of the user-requested content, wherein the advertisement selection process is processed wholly outside of the user access point system, wherein initiating the advertisement selection process comprises: retrieving or generating a common user identifier for a user of the user access point system; generating a request to conduct the advertisement selection process; embedding the common user identifier into the request to conduct the advertisement selection process; and transmitting the request to conduct the advertisement selection process to a supply-side platform for conducting the advertisement selection process, wherein the supply-side platform is configured to utilize the common user identifier to dynamically conduct the advertisement selection process; receive, from the supply-side platform, a selection of the determined one or more user-targeted advertisements for placement in the user-requested content; and transmit, to the user access point system, the determined one or more user-targeted advertisements, wherein transmission of the determined one or more user-targeted advertisements causes placement of the determined one or more user-targeted advertisements in the one or more placeholders of the user-requested content subsequent to transmission of the user-requested content, thereby reducing latency in rendering the user-requested content on the user access point system.

In certain embodiments, the user-requested content comprises a webpage. In certain embodiments, each of the one or more placeholders comprises an expandable block. In certain embodiments, each of the one or more placeholders comprises white space. In certain embodiments, the user-requested content comprises video and/or audio content. In certain embodiments, the system is further caused to prevent cookie syncing by third-parties, wherein the prevention of cookie syncing is caused at least in part by embedding the common user identifier into the request to conduct the advertisement selection process.

In certain embodiments, the determined one or more user-targeted advertisements are transmitted to the user access point system as raw data. In certain embodiments, the system is further caused to retrieve the one or more user-targeted advertisements based at least in part on JavaScript and translate the one or more user-targeted advertisements into raw data for transmission to the user access point system. In certain embodiments, the system is further caused to receive the one or more user-targeted advertisements from an advertisement server as raw data for transmission to the user access point system. In certain embodiments, the system is further caused to prevent cookie syncing by third-parties, wherein the prevention of cookie syncing is caused at least in part by transmitting the determined one or more user-targeted advertisements to the user access point system as raw data.

In certain embodiments, the system is further caused to generate and inject JavaScript into the user-requested content, wherein the JavaScript comprises the common user identifier. In certain embodiments, the system is configured not to inject any JavaScript into the user-requested content. In certain embodiments, the system is further caused to translate the common user identifier to one or more other user identifiers, wherein the one or more other user identifiers are used by one or more advertisers and/or one or more demand side platforms, wherein the translation of the common user identifier to the one or more other user identifiers is performed by utilizing a graph data structure comprising the common user identifier and the one or more other user identifiers. In certain embodiments, the system comprises a content delivery network. In certain embodiments, the system comprises the supply side platform. In certain embodiments, the advertisement selection process comprises a real-time bidding auction.

In some embodiments, a system for reducing latency in streaming user-requested content on a user access point system and reducing risk of leakage of user information comprises: one or more computer readable storage devices configured to store a plurality of computer executable instructions; and one or more hardware computer processors in communication with the one or more computer readable storage devices and configured to execute the plurality of computer executable instructions in order to cause the system to: receive a request from a user access point system and/or a content origin system to stream user-requested content to the user access point system; initiate transmission of a stream of the user-requested content to the user access point system, wherein the user-requested content comprises one or more placeholders for one or more user-targeted advertisements, thereby allowing the user access point system to initiate streaming of the user-requested content without the one or more user-targeted advertisements; initiate an advertisement selection process for determining the one or more user-targeted advertisements for placement in the stream of the user-requested content, wherein the advertisement selection process is processed asynchronously and in parallel to the initiation of streaming of the user-requested content, wherein the advertisement selection process is processed wholly outside of the user access point system, wherein initiating the advertisement selection process comprises: retrieving or generating a common user identifier for a user of the user access point system; generating a request to conduct the advertisement selection process; embedding the common user identifier into the request to conduct the advertisement selection process; and transmitting the request to conduct the advertisement selection process to a supply-side platform for conducting the advertisement selection process, wherein the supply-side platform is configured to utilize the common user identifier in conducting the advertisement selection process; receive, from the supply-side platform, a selection of the determined one or more user-targeted advertisements for placement in the stream of the user-requested content; retrieve the determined one or more user-targeted advertisements for placement in the stream of the user-requested content as raw data; and embed the determined one or more user-targeted advertisements into the stream of the user-requested content as raw data, thereby transmitting a combined stream of the user-requested content data and the determined one or more user-targeted advertisements as raw data.

In certain embodiments, the user-requested content comprises video and/or audio content. In certain embodiments, the system is further caused to prevent cookie syncing by third-parties, wherein the prevention of cookie syncing is caused at least in part by embedding the common user identifier into the request to conduct the advertisement selection process. In certain embodiments, the system is further caused to retrieve the one or more user-targeted advertisements based at least in part on JavaScript and translate the one or more user-targeted advertisements into raw data for embedding into the stream of the user-requested content. In certain embodiments, the system is further caused to receive the one or more user-targeted advertisements from an advertisement server as raw data for embedding into the stream of the user-requested data. In certain embodiments, the system is further caused to prevent advertisement blockers from accessing the user access point system, wherein the prevention of advertisement blockers from accessing the user access point system is caused at least in part by transmitting the combined stream of the user-requested content data and the determined one or more user-targeted advertisements as raw data.

In certain embodiments, the system is further caused to translate the common user identifier to one or more other user identifiers, wherein the one or more other user identifiers are used by one or more advertisers and/or one or more demand side platforms, wherein the translation of the common user identifier to the one or more other user identifiers is performed by utilizing a graph data structure comprising the common user identifier and the one or more other user identifiers. In certain embodiments, the system comprises a content delivery network. In certain embodiments, the system comprises the supply side platform. In certain embodiments, the advertisement selection process comprises a real-time bidding auction.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

A better understanding of the devices and methods described herein will be appreciated upon reference to the following description in conjunction with the accompanying drawings, wherein:

FIG. 3B is a flowchart illustrating another example embodiment(s) of asynchronous advertisement selection and/or insertion for user-requested content;

DETAILED DESCRIPTION

Figure 1:
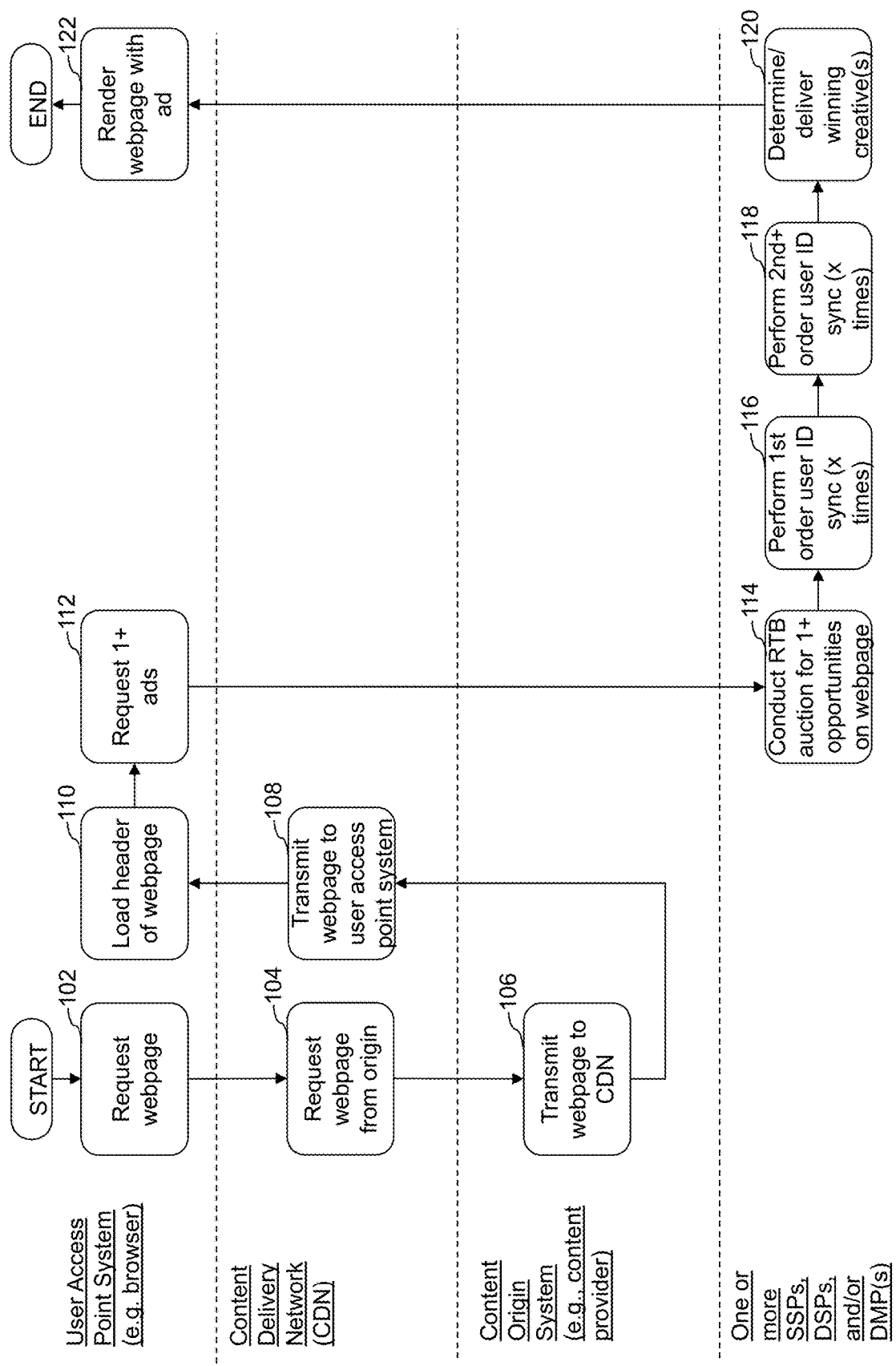
FIG. 1 is a flowchart illustrating an overview of an example embodiment(s) of header bidding for online advertising.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

With the development of technology, and in particular information and communication technology (ICT), many forms of online advertising have now become targeted. For example, an online advertisement can be selected and/or delivered to a particular user based on certain traits of the user, such as the user's demographics, psychographics, behavior, and/or the like. Further, such targeted advertisements can be delivered to a particular user through one or more Internet-based media, such as through websites, webpages, on-demand television, streaming video or audio content, Internet Protocol television, over-the-top media, and/or the like.

As a non-limiting example, when a user requests a particular website or webpage to be loaded on the user's computer or other electronic device, the requested page may be rendered with one or more targeted advertisements embedded within the page that are particular to and/or targeted for that user. For example, for illustrative purposes, a user may have previously added a product to the user's shopping cart on a web site operated by a particular online vendor. However, the user may subsequently decide not to purchase the product and move onto another website. This new website may comprise one or more advertisement slots, which can be auctioned in real-time and/or in substantially real-time to one or more advertisers. In this example, the previous online vendor may have a strong incentive to bid highly on placing an advertisement for the product that the user added to the user's online cart but eventually did not purchase. If that online vendor places a high enough bid, an advertisement for purchasing that particular product from that online vendor can be placed on the new web site or webpage that user is now browsing. The goal of the advertiser or online vendor would be that this advertisement will remind and/or otherwise entice the user to return to the online vendor to complete the purchase.

As illustrated above, user-targeted advertisements can increase efficiency of online advertising. However, on the other hand, in order to provide such efficiency for online advertisements, a number of technical issues have arose at the same time. For example, in order to allow selection and/or placement of targeted advertisements, certain embodiments of systems and methods described herein can provide real-time bidding (RTB) to determine which advertisements to place for a particular user. One related problem, however, is that RTB can take time. As a result, in certain systems and methods, rendering a webpage and/or delivering other user-requested content can take longer, due to time necessary to determine which advertisements to place. In other words, latency or delay in rendering and/or delivering other content to a user can arise due to the time and process necessary for determining and/or placing one or more advertisements within the content for that user.

As such, certain systems, devices, and methods described herein are configured to decrease such latency in rendering and/or delivering content to a user that may arise due to determining and/or placing one or more user-targeted advertisements within the content. In order to do so, as opposed to synchronous determination and/or insertion of advertisements, such as in header bidding and/or in header cloud bidding, certain embodiments herein provide asynchronous determination and/or insertion of user-targeted advertisements in user-requested content. For example, in some embodiments, RTB or other bidding or selection process for advertisements can be conducted asynchronously and/or after a webpage or other user-requested content is rendered or at least has started to be delivered, by a content delivery network (CDN) and/or supply-side platform (SSP). In particular, in some embodiments, an advertisement selection process, such as RTB, can be conducted as a function of a CDN and/or SSP asynchronously from a browser rendering a webpage and/or an app or television streaming user-requested video, audio, and/or other content. As such, in certain embodiments, one or more processes of selecting one or more targeted advertisements for a particular user can be offloaded from the browser of a user access point system, such that the user or the user access point system is not burdened by such processing and/or preventing data leakage.

In certain embodiments, RTB and/or other bidding or selection process for one or more user-targeted advertisements to be placed within the user-requested content can be conducted in parallel and/or at the same time while the user-requested content is retrieved and/or delivered to the user access point system. In certain embodiments, once one or more advertisements for placement in the content have been asynchronously selected, the one or more advertisements can then be embedded or otherwise placed in the content that has already been rendered or delivered or at least started to be delivered. As such, in some embodiments, the speed at which a webpage or other user-requested content, such as a video or audio asset, is loaded on a user access point system can be reduced, for example next to nothing, by moving the entire and/or portion of the advertisement selection and/or insertion process out-of-band. For example, in some embodiments, the system is configured to have the html page execute the call to resolve the result of the processing to whenever the web site wants, such as at the bottom of the body tag or the like. This can mean that the entire user-requested webpage can be rendered with reduced latency or zero latency impact to the website in some embodiments. In certain embodiments, a user-requested website or webpage can load first and then the advertisement content can load after the rest of the webpage content. Further, in some embodiments, all or a portion of the advertisement selection process can be moved to the server, such as a CDN and/or SSP, thereby reducing the processing needs of the user access point system.

As such, in some embodiments, the user can experience no latency or at least reduced latency compared to systems that employ header bidding and/or header cloud bidding, in enjoying the content by not having to wait until one or more user-targeted advertisements have been selected for placement within the content. As such, in certain embodiments, latency in delivering user-requested content to a user access point system can be substantially reduced compared to certain embodiments of header bidding, in which one or more advertisement bidding processes are performed within the header, and/or header cloud bidding, which may move the client side work to the server but may still pause header execution thereby slowing down webpage retrieval. Thus, in some embodiments, the consumer experience, while requesting and reading a webpage and/or enjoying user-requested video and/or audio content, can be vastly improved.

Further, content requested by a user can include not only webpage content, but also video content, audio content, or the like. For example, on-demand video, streaming video, over-the-top (OTT) television content, and/or IPTV content have become more readily available with developments in technology. As with webpage content, in order provide a better user experience, among other reasons, it can be important to minimize and/or at least decrease latency in loading and/or delivering such video and/or audio or other content to a user. As such, in some embodiments herein, systems, methods, and devices can be configured to provide asynchronous insertion of advertisements into video and/or audio content or other user-requested content. More specifically, if one or more user-targeted advertisements need to be selected before a user-requested content is delivered, then the user may experience substantial latency in streamlining the user-requested content. Further, if JavaScript is used to deliver a video or audio advertisement, for example, transition time may be necessary in order to load the audio or video advertisement in real-time at certain segments within the user-requested content. As such, in order to minimize such latency in both the initial streaming or loading and/or during the streaming, in some embodiments, the system can be configured to asynchronously conduct RTB or other targeted advertisement selection process outside of the user access point system, for example at a CDN and/or SSP. Further, in some embodiments, rather than delivering the winning advertisement in the form of JavaScript, the system can be configured to deliver the advertisement as native content. For example, in certain embodiments, the winning advertisement can be previously stitched into the user-requested content prior to delivery, thereby even further decreasing latency.

In addition, in order to efficiently determine and/or deliver a winning advertisement, a number of entities and advertisement service providers are typically involved, such as advertisers, content publishers, ad exchanges, supply-side platforms (SSP), demand-side platforms (DSP), and/or data management platforms (DMP). In turn, in order to decrease transaction costs and also to ensure technical compatibility between such entities, it can be important that the different entities involved are able to identify a particular user. One technical problem relating to identification of users in such multi-actor system is that each entity can have its own user identifier or ID. As such, different entities can use different user IDs for the same user. In order to ensure compatibility, certain embodiments provide one-to-one matching between different user IDs. In order to do so, some embodiments utilize cookies, pixels, JavaScript, and/or the like. For example, cookie syncing can be used in certain systems in order to sync user IDs across different entities. This, however, can result in privacy issues, such as data leakage. For example, by allowing use of third-party cookies, pixels, and/or JavaScript tags, user information can be leaked to one or more third parties, such as those that do not have any contractual relationship and/or legitimate interest to the user data or information.

As such, certain systems, devices, and methods described herein are configured to address such data leakage and/or other privacy issues by preventing and/or removing the need for cookie syncing or user ID syncing. For example, in some embodiments, the system can be configured to conduct and/or initiate RTB and/or other process for selecting one or more advertisements for placement in user-requested content at a location that is separate from and outside of the browser, as opposed to header bidding. Rather, in certain embodiments, RTB and/or other targeted advertisement selection process can be initiated and/or performed by a content delivery network (CDN) and/or supply-side platform (SSP) that is separate from the browser and/or at a different location. Also, in some embodiments, RTB and/or other targeted advertisement selection process can be initiated and/or performed at the same time as and/or during streaming of user-requested content, as opposed to prior to rendering or streaming user-requested content. By doing so, access to the browser by one or more unwanted advertisement service providers, such as DSPs and/or other advertisers, can be denied or prevented, thereby preventing placement of unwanted third-party cookies, JavaScript tags, and/or pixels on the browser and/or user computer system. In some embodiments, only the CDN and/or SSP that is conducting or initiating the RTB or other advertisement selection process can have a legitimate reason and/or opportunity to place a JavaScript tag, pixel, and/or cookie embedding the CDN and/or SSP's user ID. In certain embodiments, the CDN and/or SSP can be configured to provide user identity services, such as translating the CDN and/or SSP's user ID to a user ID used by one or more other DSPs, SSPs, advertisers, and/or other entities, for example through a graph-like translation map. As such, in certain embodiments, the other DSPs, advertisers, and/or other entities may not have a legitimate reason and/or opportunity to place their JavaScript tag, pixel, and/or cookie on the webpage and/or browser as the user ID can be translated and given by the CDN and/or SSP.

In addition, in some embodiments, the system can also be configured to deliver native targeted advertisement content, for example from the publisher and/or CDN, as opposed to delivering advertisement content in the form of JavaScript, which may need to be retrieved from a random DSP or advertisement server of an advertiser. This can even further eliminate any opportunity for an unwanted DSP, advertiser, and/or other entity to access the webpage and/or browser. More specifically, in certain systems, such as those that utilize header bidding, a winning advertisement can be embedded in the user-requested content, such as a webpage, video, or the like, through use of JavaScript which can then be configured to access and/or pull the creative asset from an advertisement server of the advertiser. This additional use of JavaScript, however, can provide another opportunity to other unrelated DSPs and/or other advertisers to inject their own JavaScript tag, cookie, pixel, or the like onto the page and/or conduct one or more levels of cookie syncing or user ID syncing. As more and more layers of cookie syncing and/or user ID syncing occurs with more parties involved, the risk of data leakage can further increase. However, by delivering native advertisement or creative content in some embodiments herein, third party advertisement service providers may not even be given an opportunity to inject their JavaScript tag, pixel, and/or cookie, let alone perform cookie syncing and/or user ID syncing.

In particular, in certain embodiments, an advertisement creative in the form of video, audio, VR, and/or AR content, can be stitched into a user-requested content, such as video, audio, VR, and/or AR content, at the CDN level prior to delivery to and/or streaming by a user access point system. As such, in some embodiments, there can be no JavaScript associated with delivering an advertisement creative asset and/or breakage in user-requested content. Rather, in certain embodiments, a continuous stream of user-requested video, audio, AR, and/or VR content can be delivered to and/or streamed by a user access point system, thereby preventing advertisement blockers from filtering out the advertisement content and/or determining whether a particular stream or delivery of content is an advertisement creative and/or user-requested content or manifest.

In summary, various embodiments described herein relate to systems, methods, and devices for decreasing or minimizing latency and/or preventing data leakage that may arise from targeted advertisement selection and/or insertion. In certain embodiments, one or more targeted and/or personalized advertisements can be determined and/or inserted for a particular user, but the user may not experience much or any latency in enjoying the user-requested content, whether it may be a webpage or video or audio content. As such, by utilizing one or more back-end processes, certain systems, devices, and methods herein can provide fast, scaled, and/or globally distributed solutions for delivering targeted advertisements without affecting the user's experience of the user-requested content.

In order to do so, in some embodiments, the system can be configured to conduct asynchronous "CDN bidding" or "SSP bidding," in which one or more processes for RTB, other bidding scheme, and/or other process for selecting one or more advertisements for placement in user-requested content can be conducted at a CDN or SSP separate from the browser, as opposed to header bidding in which one or more such processes are conducted or performed within the browser. As such, CPU, memory, or other computer resource usage and/or processing power of the browser and/or user access point system can be decreased. Further, in certain embodiments, asynchronous selection and/or insertion of one or more advertisements to be placed in the user-requested content can allow for streamlined rendering of the user-requested content by allowing rendering of the same without such advertisements, at least initially, thereby minimizing and/or decreasing latency of delivering the user-requested content.

In addition, in some embodiments, the system can be configured to provide user identity services at the CDN and/or SSP. For example, in certain embodiments, a universal user ID, a first-party user ID from the user-requested content publisher, or user ID of the CDN and/or SSP can be used for the advertisement selection process, thereby preventing other DSPs and/or other advertisers from injecting their own user ID as part of a JavaScript tag, pixel, and/or cookie into the browser or user computing system. For example, in some embodiments, a first-party user ID, universal user ID, other common user ID, and/or user ID of the CDN and/or SSP can be embedded into a signal all the way through the chain. In some embodiments, a first-party user ID issued and/or used by a publisher, universal user ID, other common user ID, and/or user ID of the CDN and/or SSP can be transmitted and/or used across the entire ecosystem, from one or more publishers, one or more advertisers, one or more SSPs, and/or one or more DSPs, in order to avoid having all or any or one or more actors installing a user ID sync JavaScript on a user access point system's browser or other app.

As such, in certain embodiments, the system can be configured to prevent cookie syncing and/or user ID syncing across a plurality of advertisement service providers, thereby decreasing the possibility and/or risks related to data leakage that can arise from the sharing or syncing of user ID or other user data with other third-party websites and/or entities, such as one or more DSPs, one or more advertisers, one or more publishers, and/or one or more SSPs. Moreover, in certain embodiments, a CDN and/or SSP can provide user identity services, in which a universal user ID, first-party user ID from the publisher, or user ID of the CDN and/or SSP can be translated into one or more user IDs used by one or more other DSPs, SSPs, and/or other advertisers, for example using a graph-like translation process and/or database structure, thereby preempting such third-party DSPs, SSPs, and/or other advertisers from needing to inject their own user ID into the browser by utilizing JavaScript tags, pixels, and/or cookies and further decreasing the possibility of associated data leakage. In addition, by reducing and/or completely removing any need for user ID syncing and/or cookie syncing, any related latency arising therefrom can be further reduced in some embodiments as translation of one or more user IDs can be reduced and/or eliminated completely. Further, by reducing and/or completely removing any need for user ID syncing and/or cookie syncing, processing burden on the user access point system can be further reduced as translation of one or more user IDs can be reduced and/or eliminated completely that may have otherwise been required to be processed by the user access point system or a browser or app thereon.

In some embodiments, the system can be further configured to deliver one or more winning advertisements or creatives in the form of native content, as opposed to by transmitting JavaScript, thereby even further preventing any opportunity by third-party DSPs, SSPs, and/or other advertisers to inject JavaScript tags, pixels, and/or cookies and further decreasing the possibility of associated data leakage. Furthermore, in some embodiments, one or more processes relating to asynchronous advertisement insertion, for example at a CDN and/or SSP, prevention of data leakage, and/or user identity services can be used for insertion of advertisements in other formats, such as video and/or audio, into user-requested video and/or audio content, in addition to webpage content.

As described above, certain embodiments described herein generally relate to systems, methods, and devices for improving the efficiency and/or security of loading advertisements or targeted advertisements on a web-based platform, for example as part of rendering a webpage and/or delivering other user-requested content, such as audio or video. In particular, some embodiments described herein can minimize and/or decrease latency of rendering one or more webpages or other audio or video user-requested content over the Internet or other network by utilizing one or more asynchronous processes for selecting and/or inserting one or more advertisements to be placed into one or more impression opportunities or advertisement slots on the webpage or other user-requested content, such as real-time bidding (RTB) or other processes. Such asynchronous advertisement selection and/or insertion can be performed at a CDN or SSP or other location that is separate from the browser, app, or user computing device or a process thereof. Further, such asynchronous advertisement selection and/or insertion can be performed wholly and/or partially independent of rendering and/or delivering the user-requested content, at least initially, thereby decreasing latency in delivering user-requested content.

Moreover, in some embodiments, the systems described herein are configured to decrease risks related to data leakage arising from cookie syncing or user ID syncing by a number of DSPs, SSPs, DMPs, and/or advertisers. For example, in certain embodiments, the system can be configured to inject only one JavaScript tag, pixel, or cookie that comprises a universal user ID or user ID used only by the CDN or SSP that is conducting the asynchronous selection and/or insertion of one or more advertisements into the user-requested content. Rather, the CDN or SSP that is conducting the asynchronous selection and/or insertion of one or more advertisements into the user-requested content can be configured to provide user identity services by translating the user ID into one or more user IDs used by individual DSPs and/or advertisers, for example by using a graph-like user ID translation data structure. In other embodiments, the system can be configured not to utilize or inject any JavaScript tag, pixel, and/or cookie into the user-requested content. As such, in some embodiments, the system can be configured to prevent cookie syncing or user ID syncing by a number of third-party DSPs and/or advertisers. In some embodiments, the system can be further configured to deliver one or more winning advertisements as native content, as opposed to JavaScript, thereby further eliminating the opportunity for third-party DSPs and/or advertisers from accessing the user-requested content or webpage.

As such, certain embodiments described herein can comprise one or more distinctive and advantageous features compared to header bidding, such as but not limited to providing asynchronous bidding, selection, and/or insertion of one or more advertisements into user-requested content, providing bidding, selection, and/or insertion of one or more advertisements into user-requested content at the CDN and/or SSP level, preventing cookie syncing or user ID syncing, minimizing latency in delivering or rendering user-requested content that may arise from the selection and/or insertion of one or more advertisements, preventing data leakage, delivering one or more winning advertisements as native content as opposed to JavaScript, providing user identity services at the CDN and/or SSP level, providing a universally unique identifier (UUID) and/or globally unique identifier (GUID), preventing data leakage, and/or any other technical advantage or solution that is described herein.

Typically, as a non-limiting example, header bidding can describe systems and/or methods that perform real-time bidding and/or other types of bidding in the header of a webpage that is being rendered on a browser while the webpage is being rendered, thereby increasing latency in rendering the user-requested webpage. FIG. 1 is a flowchart illustrating an overview of an example embodiment(s) of header bidding for online advertising.

As illustrated in FIG. 1, in some embodiments, a user access point system or a process running thereon, such as a browser, can request a webpage to be rendered at block 102. This request can be delivered directly to the content origin system or to a content delivery network (CDN) that is configured to deliver the content. For example, a CDN can refer to a system of servers that has and/or has access to network resources that can allow for fast delivery of content, such as a webpage or other user-requested content, over the Internet or other network to the user access point system. Once the CDN receives the webpage request from the user access point system, in certain embodiments, the CDN can request the webpage content from a content origin system at block 104. The content origin system can be any type of content provider, such as a news publisher, a video content provider, and/or any other website. Once the content origin system receives the request from the CDN, the content origin system can then be configured to transmit the webpage content to the CDN at block 106. The CDN can then, in some embodiments, transmit the webpage content back to the user access point system at block 108.

In certain embodiments, after receiving the webpage content and/or a portion thereof, the user access point system can be configured to load the webpage and/or at least a header portion of the webpage at block 110. In some embodiments, an underlying JavaScript and/or other code in the header portion of the webpage can initiate a request for one or more advertisements for placement on the webpage at block 112. However, in certain embodiments of header bidding, the full webpage or webpage content will not be able to be rendered on the user access point system or browser right away, because the webpage does not yet have the advertisements to fill in one or more advertisement slots on the webpage. Rather, rendering of the webpage may need to be delayed until the system determines which advertisements to include through an RTB auction or other advertisement selection process.

In some embodiments, once an ad exchange or SSP receives the request, an RTB auction and/or other advertisement placement selection process can be initiated and/or conducted at block 114 for one or more impression opportunities on the webpage that was requested by the user. For example, one or more ad exchanges and/or SSPs can be configured to receive bids from one or more DSPs and/or advertisers in real-time and/or substantially real-time for placement on the webpage that was requested by the user. However, in order for the individual DSPs and/or advertisers to provide a more accurate bid for the particular user, and thereby promote efficient bidding, the one or more DSPs and/or advertisers will likely need to be able to identify the user. As such, in some embodiments, the one or more DSPs and/or advertisers that are placing bids on the one or more impression opportunities on the webpage may be configured to perform one or more cookie syncing and/or user ID syncing processes in order map one or more user IDs from one advertising service provide platform to another.

As a non-limiting example, in some embodiments, after an ad exchange or SSP sends back the advertisement placement request and creates a third-party cookie, the ad exchange or SSP can be configured to redirect, for example through a http redirect, the advertisement request to a pixel URL to another advertisement service provider, such as a DSP or a DMP, passing the user ID in the URL parameter. The DSP or DMP that receives the pixel URL can read its own cookie or create a new cookie and save the user ID passed from the ad exchange or SSP with its own user ID in a one-to-one cookie matching table. In certain embodiments, the DMP or DSP can make the redirect back to the ad exchange or SSP, passing its own user ID in the URL parameter. The ad exchange or SSP can then receive this request, read its own cookie, and store the DSP or DMP user ID along with its own ID in its one-to-one cookie matching table. In other words, header bidding can require one or more exchange processes between one or more SSPs, DSPs, publishers, and/or advertisers in which each of the involved entities can send each other their user identities for a particular user. As such, the sync can be one directional or bidirectional.

Referring back to FIG. 1, in some embodiments, one or more such cookie synching and/or user ID synching can be performed at block 114. In some embodiments, one or more layers of cookie syncing or user ID syncing can be performed. For example, the SSP can have a contractual relationship with one or more DSPs. In other words, the SSP can have a sync list. As such, a first order user ID sync or cookie sync can be performed at block 116 for the number of DSPs or advertisers in the SSP's sync list. However, each of these DSPs can further have a sync list comprising one or more other DSPs or advertisers. As such, in certain embodiments, another layer of user ID syncing or cookie syncing can exist. In particular, in some embodiments, a secondary order of user ID syncing or cookie syncing can occur at block 118, which can be repeated a number of times for each DSP or advertiser in the first order DSP's sync list. Additional layers of cookie syncing and/or user ID syncing can exist on both the DSP side and/or the SSP side.

As one can imagine, substantial privacy issues and/or data leakage can result from the vast number of cookie synching and/or user ID synching in certain embodiments of header bidding. For example, in some embodiments of header bidding, one or more second order or third order user identity matching, user ID syncing, and/or cookie syncing can arise. The first order syncing can be controlled by the SSP or ad exchange that is in a contractual relationship with the publisher of the user-requested content, as such syncing can occur only between entities that are in the SSP or ad exchange's sync list. However, it may not be technically possible to control any subsequent second order or third order syncing that may arise downstream with entities that have no contractual relationship with the publisher and/or SSP or ad exchange. Certain such entities that now have access to user information through syncing may then sell or otherwise transact on that data, thereby causing data leakage and substantial privacy issues that are unique to the Internet.

Further, in certain embodiments of header bidding, such user identity matching, user ID syncing, and/or cookie syncing can further cause additional latency in rendering the page. As previously discussed, the webpage or other user-requested content may not be rendered until the advertisements for filling in one or more advertisement slots on the webpage or other content have been determined. The RTB or other process for selecting one or more advertisements for placement can be delayed or prolonged by one or more user identity matching processes, user ID syncing, and/or cookie syncing as described above. As such, in certain embodiments of header bidding, a plurality of such user identity matching processes can further delay delivery of user-requested content. In some embodiments, only when all involved parties in the RTB or other advertisement selection process are aware of the user identity will such parties place a bid for their advertisement creative.

In certain embodiments, once the RTB or other advertisement placement selection process has been completed, the system can then determine and/or deliver one or more winning advertisement creatives at block 120. In some embodiments, the one or more winning advertisement creatives for placement on the webpage or other user-requested content can be delivered by transmitting a JavaScript tag, which can be used to retrieve the advertisement creative from an advertisement server of the advertiser. In some embodiments of header bidding, one or more advertisement creatives to fill in the one or more advertisement slots and/or impression opportunities on the webpage may be delivered to the user access point system after the bidding and/or real time auction scheme has been completed.

In some embodiments, the user access point system and/or browser or app can then finally be configured to render the complete webpage or other user-requested content with the one or more ad slots being fulfilled at block 122. More specifically, in certain embodiments, the one or more SSPs and/or DSPs can be configured to inject another JavaScript tag into the webpage which can then pull the advertisement creative at block 122 in order to render the full web page. As such, there can be a substantial latency in rendering a full webpage or other user-requested content in certain embodiments of header bidding, arising from synchronous RTB or other advertisement selection process that can be a bottleneck in rendering the webpage or other user-requested content. Further, substantial risks of data leakage can also be present in certain embodiments of header bidding.

As such, it can be advantageous to be able to minimize and/or at least decrease latency that may arise from synchronous bidding for impression opportunities in rendering a user-requested webpage and/or other content, as can be the case for header bidding. In addition, it can be further advantageous to prevent and/or minimize the use of cookie synching and/or user ID synching, which can lead to additional latency and/or data leakage or other privacy issues, as can be the case for header bidding. As described above, one cause of latency in rendering a user-requested webpage and/or other content can arise from the fact that some embodiments of header bidding require an RTB auction or other advertisement selection process for one or more impression opportunities on the webpage and/or other content. Related cookie syncing and/or user ID syncing can also add to the latency. Further, one cause of privacy issues and/or data leakage in certain embodiments of header bidding can stem from the use of JavaScript and/or pixels that are required for user ID syncing, cookie syncing, and/or delivery of advertising creatives.

Asynchronous Advertisement Selection and/or Insertion for a User-Requested Webpage To address such technical problems, in some embodiments described herein, the system can be configured to utilize one or more asynchronous processes for selecting and/or inserting one or more advertisements into a user-requested webpage and/or other content, which can occur in parallel to rendering of the user-requested webpage and/or other content, and which can occur at a separate location from the browser, such as at a CDN or SSP. Further, in certain embodiments described herein, the system can be configured not to use JavaScript at all or at least minimize the use of JavaScript tags and/or pixels, for example by delivering the advertisement creative as native content as opposed to JavaScript and/or by using a first-party user ID from the publisher, a universal ID, and/or a user ID of the SSP or CDN, in order to further reduce latency in delivering the user-requested webpage or content and/or to address the privacy issues described herein, such as data leakage.

Figure 2A:
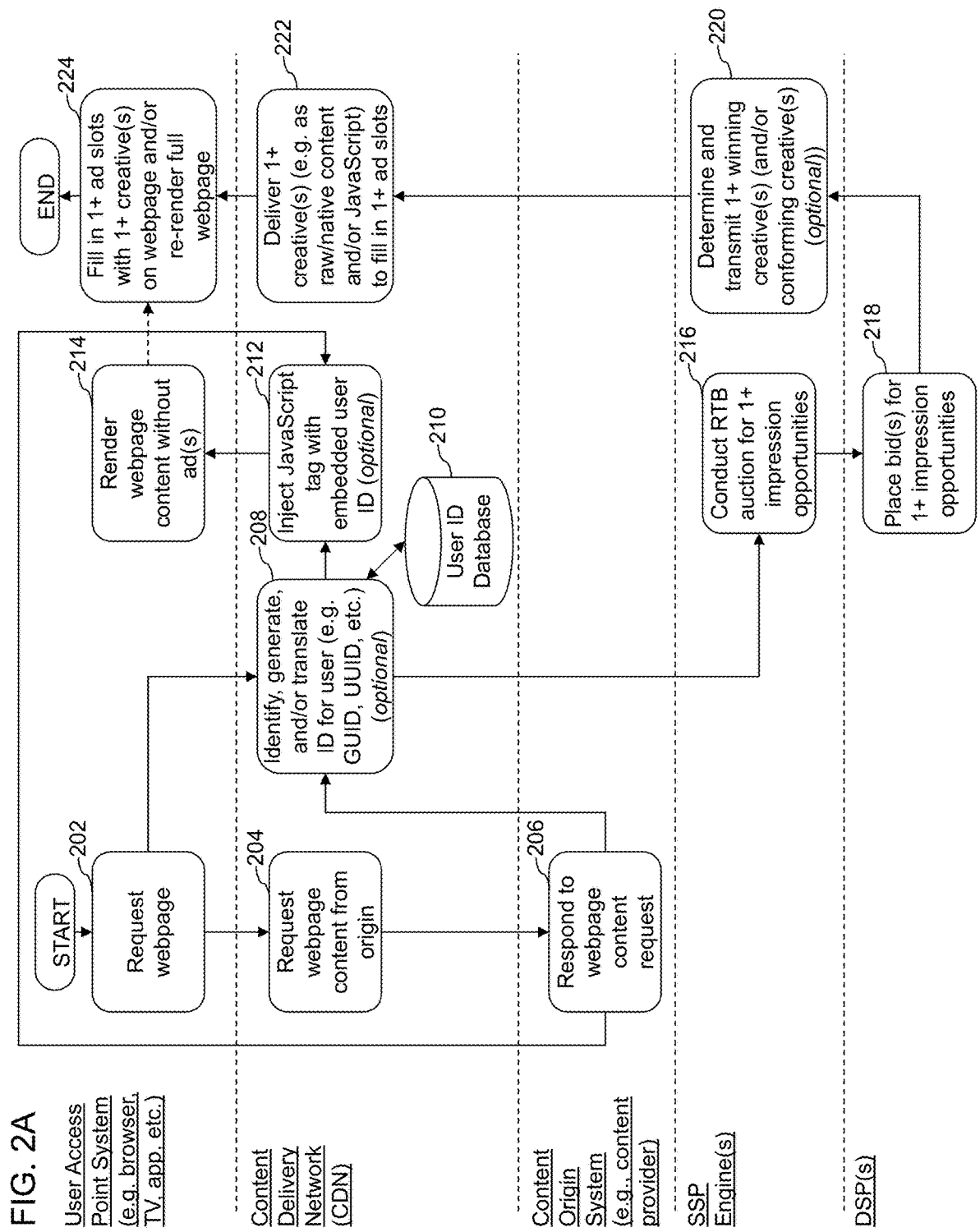
FIG. 2A is a flowchart illustrating an example embodiment(s) of asynchronous advertisement selection and/or insertion for a user-requested webpage(s)

FIG. 2A is a flowchart illustrating an example embodiment(s) of asynchronous advertisement selection and/or insertion for a user-requested webpage(s). More specifically, as illustrated in FIG. 2A, in some embodiments, rather than a browser initiating the bidding process for one or more advertisements as in header bidding, the CDN can be configured to initiate the bidding process for one or more advertisements.

Referring to FIG. 2A, in some embodiments, a user access point system can request a webpage to be rendered at block 202. For example, a web browser, a mobile application or app, a TV browser or other TV app, and/or the like running on a user access point system can request a webpage to be rendered. In certain embodiments, the request from the user access point system can be transmitted directly to a content origin system or content provider, such as a publisher of the user-requested webpage. The content origin system, in some embodiments, can then relay the request to a CDN for delivering the webpage. In other embodiments, the webpage request from the user access point system can be directly transmitted to the CDN. In either embodiment, the CDN can request the webpage content from the content origin system at block 204. In certain embodiments, the content origin system can respond to the webpage content request at block 206.

In some embodiments, as the user access point system requests the webpage and/or as the content origin system responds to such request, the system can be configured to simultaneously and/or separately initiate a user identity service. The user identity service can be performed by the CDN in some embodiments. As part of the user identity service, in some embodiments, the system can be configured to identify, generate, and/or translate an identifier for the user. For example, in some embodiments, the system can be configured to retrieve or access a first-party user ID issued and/or used by the publisher or content origin system and/or a user ID used by the CDN, which can be further embedded in all subsequent processes, from the content origin system and/or a user ID database 210. In other embodiments, the system can be configured to identify, retrieve, and/or generate a GUID, UUID, and/or other common ID for the user, for example from a user ID database 210.

In some embodiments, the CDN can be further configured to generate and/or inject a JavaScript tag and/or pixel embedding the retrieved, generated, and/or identified user ID, such as a UUID, GUID, first-party user ID used by the content origin system, user ID used by the CDN, and/or some other common user ID, at block 212 into the webpage, for example where one or more advertisement slots or impression opportunities are placed within the webpage. However, in certain embodiments, the CDN may not be configured to conduct any user identification service and/or generation or injection of a JavaScript tag at all.

In certain embodiments, once the content origin system responds to the webpage content request and/or once a JavaScript tag with the embedded user ID has been generated and/or injected into the webpage content by the CDN, the user access point system can be configured to render the whole webpage content at block 214 without any advertisements embedded in the web page. As such, latency in rendering the webpage on the user access point system that may arise from synchronous advertisement selection and/or insertion can be minimized or at least decreased. In some embodiments, the whole webpage can be rendered at block 214 with one or more white spaces and/or expanding or expandable blocks or slots displayed where the advertisement slots or impression opportunities are located on the webpage. As will be described later, the one or more white spaces and/or expanding or expandable blocks or slots can be filled in with one or more winning advertisement creatives later on.

In some embodiments, as the user access point system requests the webpage and/or as the content origin system responds to such request, the system can be configured to simultaneously and/or separately initiate an RTB auction or other process for selecting one or more advertisements for placement on one or more advertisement slots or impression opportunities on the requested webpage. As such, in some embodiments, the webpage retrieval and advertisement selection process can be performed in parallel and/or asynchronously with the webpage content retrieval, thereby decreasing latency.

In certain embodiments, in initiating the RTB auction or other advertisement selection process, the CDN can be configured to embed and/or translate a user ID in block 208. For example, in some embodiments in which a first-party user ID from the publisher or a CDN user ID is to be used, the CDN can be configured to insert the first-party user ID or CDN user ID and/or translate the first-party user ID or CDN user ID to a user ID used by one or more DSPs or other advertisers at block 208. Similarly, in certain embodiments in which a UUID, GUID, and/or other common ID is to be used, the CDN can be configured to insert the UUID, GUID, and/or other common ID and/or translate the UUID, GUID, and/or other common ID to a user ID used by one or more DSPs, DMPs, and/or other advertisers at block 208. In some embodiments, the system can be configured to utilize a graph data structure to translate the first-party user ID, UUID, GUID, CDN user ID, and/or some other common user ID to and/or from one or more user IDs used by individual DSPs, DMPs, and/or other advertisers. An example of such graph data structure or graph translation map is provided in FIG. 4.

In some embodiments, as an asynchronous process to the webpage content retrieval, the system can be configured to conduct an RTB auction or other advertisement selection process at block 216 for filling in one or more impression opportunities on the webpage. For example, in certain embodiments, an SSP engine can be configured to conduct an RTB auction or other advertisement selection process for one or more impression opportunities on the webpage at block 216.

As such, one or more webpage content retrieval processes and/or advertisement selection processes can be performed asynchronously in time and also by separate system entities, in which the browser renders the webpage content while the CDN initiates the RTB or other advertisement selection process. Thus, latency in rendering the webpage can be reduced by not having to wait for determination of one or more advertisements to be placed on the webpage and also by reducing the necessary processing power of the user access point system in rendering the page, as the RTB or advertisement selection process or syncing may no longer be performed in the browser. As such, a user can be able to view the whole webpage content almost immediately after requesting the same and/or without any latency arising from having to wait for the RTB or other advertisement selection process.

In some embodiments, in conducting the RTB auction or other advertisement selection process, the SSP engine can be configured to provide one or more user IDs used by individual DSPs and/or other advertisers to the CDN for updating and/or maintaining a user ID translation table and/or translate one or more user IDs. Thus, by providing the identity service as a function of the CDN, cookie syncing or user ID syncing can be prevented as individual DSPs may no longer have any reason and/or opportunity to be on the webpage by placing a pixel or the like, which can further reduce latency by removing one or more syncing processes and also prevent data leakage.

In response to the SSP engine conducting the RTB auction and/or other bidding scheme, one or more DSPs can be configured to place one or more bids for the one or more impression opportunities at block 218. Once the SSP engine receives the one or more bids from the one or more DSPs, the SSP engine can be configured to determine and/or transmit the one or more winning creatives at block 220 to the CDN. In certain embodiments, the SSP engine is further configured to determine one or more winning advertisement creatives that conform to the requirements to the one or more ad impression opportunities at block 220. For example, the SSP engine can be configured to determine that a particular creative for a winning advertiser comprises one or more dimensions and/or other features or characteristics, such as text and/or image(s), that are required for placement in one or more impression opportunities or advertisement slots on the webpage. As such, in some embodiments, the system can be configured to match one or more advertisement creative elements or components with one or more advertisement slots or impression opportunities.

In some embodiments, the CDN can be configured to deliver the one or more winning advertisement creatives at block 222 to fill in the one or more advertisement slots on the webpage. For example, in some embodiments, the CDN can be configured to deliver the one or more winning advertisement creatives as raw data and/or native content, such as image files, text files, and/or video files, as opposed to delivering JavaScript. By delivering raw data or native content for the one or more winning advertisement creatives, the system can further prevent any opportunity by one or more other DSPs, SSPs, and/or advertisers from performing cookie syncing and/or user ID syncing, thereby further reducing any unnecessary processing by the user access point system and/or also further preventing risks of data leakage through syncing. In some embodiments, the CDN can be configured to receive raw data of one or more winning advertisement creatives from one or more advertisers or one or more DSPs, for example from an advertisement server of the like, which can be delivered or transmitted to the user access point system as raw data or native content. In certain embodiments, the CDN can be configured to receive JavaScript for retrieving one or more winning advertisement creatives from one or more advertisers or one or more DSPs, for example from an advertisement server or the like, as the one or more advertisers or one or more DSPs can be configured to provide JavaScript. Such JavaScript can then be used by the CDN, in certain embodiments, to retrieve one or more advertisement creatives in raw data format and provide the same to the user access point system. As such, in some embodiments, the CDN can be configured to translate JavaScript corresponding to an advertisement creative to native content or raw data of the advertisement creative for delivery to the user access point system. In other embodiments, the CDN can be configured to deliver the one or more winning advertisement creatives as JavaScript, which can allow the advertisement creative to be retrieved from an advertisement server of the advertiser.

Once the CDN delivers the one or more winning advertisement creatives, the user access point system can then be configured to fill in the one or more advertisement slots on the webpage with the one or more winning advertisement creatives at block 224. More specifically, in embodiments in which a white space was previously rendered for one or more advertisement slots on the webpage, the user access point system can be configured to fill in the one or more white spaces with the one or more winning advertisement creatives without re-rendering the whole page. In other embodiments in which an expanding or expandable block or slot was previously rendered for one or more advertisement slots on the webpage, the user access point system can be configured to re-render the full webpage. Embodiments in which one or more expanding or expandable blocks or slots were placed in the one or more advertisement slots may be slower than other embodiments in which one or more white block spaces were placed instead, as the web browser or other process running on the user access point system may need to re-render the whole page. On the other hand, however, by providing one or more expanding or expandable blocks or slots in spaces where one or more advertisement slots are present on a webpage, a full webpage without any white space or other distraction can be provided to the user while the advertisement selection process is being performed.

As such, from a user's point of view, the user can be able to view the whole webpage content without having to wait for the system to determine which advertisements to place on the webpage. Rather, the user can view the whole webpage content immediately and/or without substantial latency after requesting the webpage. In other words, after the webpage has already been rendered or at least a portion of the webpage content has already been rendered, the system can be configured to asynchronously determine one or more ads to place on the webpage at the CDN level rather than at the browser or user access point system level. As such, in some embodiments described herein, the system can be said to conduct CDN bidding rather than header bidding. In other words, while the user is already enjoying the webpage content, determination and/or bidding for one or more advertisements to be placed on the webpage can be conducted elsewhere separately and/or in parallel at a location that is separate and/or distinct from the browser, such as at the CDN and/or SSP.

Figure 2B:
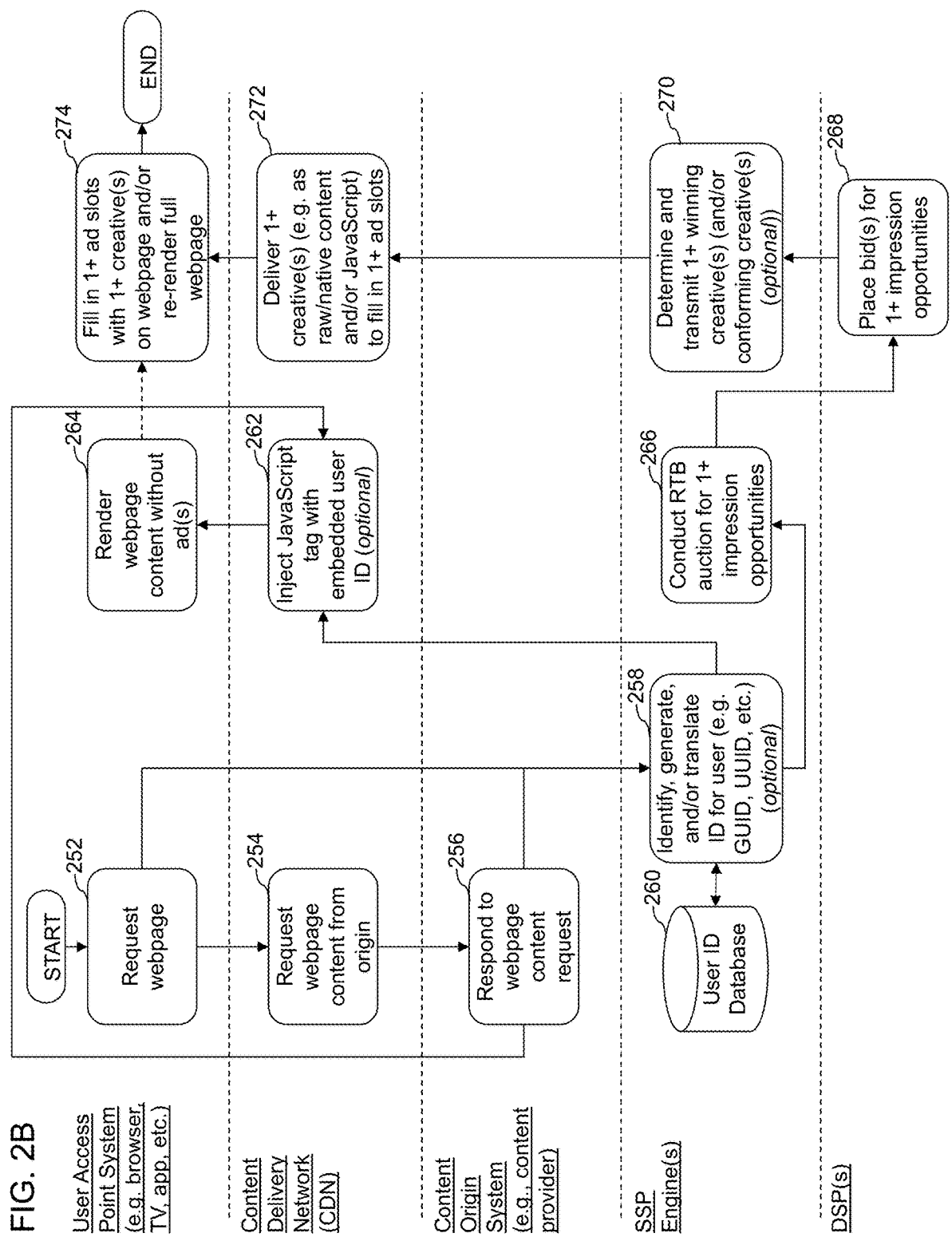
FIG. 2B is a flowchart illustrating another example embodiment(s) of asynchronous advertisement selection and/or insertion for a user-requested webpage(s)

FIG. 2B is a flowchart illustrating another example embodiment(s) of asynchronous advertisement selection and/or insertion for a user-requested webpage(s). More specifically, as illustrated in FIG. 2B, in some embodiments, rather than a browser initiating the bidding process for one or more advertisements as in header bidding or the CDN initiating the bidding process in CDN bidding, an SSP, such as an SSP in a contractual relationship with the content provider or publisher, can be configured to initiate the bidding process for one or more advertisements. In certain embodiments, the SSP can be embedded in the CDN and/or be configured to work in collaboration with the CDN.

Referring to FIG. 2B, in some embodiments, a user access point system can request a webpage to be rendered at block 252. For example, a web browser, a mobile application or app, a TV browser or other TV app, and/or the like running on a user access point system can request a webpage to be rendered. In certain embodiments, the request from the user access point system can be transmitted directly to a content origin system or content provider, such as a publisher of the user-requested webpage. The content origin system, in some embodiments, can relay the request to a CDN for delivering the webpage. In other embodiments, the webpage request from the user access point system can be directly transmitted to the CDN. In either embodiment, the CDN can request the webpage content from the content origin system at block 254. In certain embodiments, the content origin system can respond to the webpage content request at block 256.

In some embodiments, as the user access point system requests the webpage and/or as the content origin system responds to such request, the system can be configured to simultaneously and/or separately initiate a user identity service. The user identity service can be performed by the SSP engine in some embodiments. As part of the user identity service, in some embodiments, the system can be configured to identify, generate, and/or translate an identifier for the user. For example, in some embodiments, the system can be configured to retrieve or access a first-party user ID issued and/or used by the publisher or content origin system or a user ID used by the SSP engine, which can be further embedded in all subsequent processes, from the content origin system and/or a user ID database 260. In other embodiments, the system can be configured to identify, retrieve, and/or generate a GUID, UUID, and/or other common ID for the user, for example from a user ID database 260.

In some embodiments, identified, retrieved, and/or generated user ID by the SSP engine can be transmitted to the CDN. Once the content origin system responds with the webpage content, the CDN can be further configured to generate and/or inject a JavaScript tag and/or pixel embedding the retrieved, generated, and/or identified user ID, such as a UUID, GUID, other common user ID, first-party user ID used by the content origin system, and/or SSP engine user ID at block 262 into the webpage, for example where one or more advertisement slots or impression opportunities are placed within the webpage. However, in certain embodiments, the CDN may not be configured to conduct any user identification service and/or generation or injection of a JavaScript tag at all.

In certain embodiments, once the content origin system responds to the webpage content request and/or once a JavaScript tag with the embedded user ID has been generated by the SSP engine and/or injected into the webpage content by the CDN, the user access point system can be configured to render the whole webpage content at block 264 without any advertisements embedded in the web page. As such, latency in rendering the webpage on the user access point system that may arise from synchronous advertisement selection and/or insertion can be minimized or at least decreased. In some embodiments, the whole webpage can be rendered at block 264 with one or more white spaces and/or expanding or expandable blocks or slots displayed where the advertisement slots or impression opportunities are located on the webpage. As will be described later, the one or more white spaces and/or expanding or expandable blocks or slots can be filled in with one or more winning advertisement creatives later on.

In some embodiments, as the user access point system requests the webpage and/or as the content origin system responds to such request, the system can be configured to simultaneously and/or separately initiate an RTB auction or other process for selecting one or more advertisements for placement on one or more advertisement slots or impression opportunities on the requested webpage. As such, in some embodiments, the webpage retrieval and advertisement selection process can be performed in parallel and/or asynchronously with the webpage content retrieval, thereby decreasing latency.

In certain embodiments, in initiating the RTB auction or other advertisement selection process, the SSP engine can be configured to embed and/or translate a user ID in block 258. For example, in some embodiments in which a first-party user ID from the publisher and/or a SSP engine user ID is to be used, the SSP engine can be configured to insert the first-party user ID or SSP engine user ID and/or translate the first-party user ID or SSP engine user ID to a user ID used by one or more DSPs or other advertisers at block 258. Similarly, in certain embodiments in which a UUID, GUID, and/or other common ID is to be used, the SSP engine can be configured to insert the UUID, GUID, and/or other common ID and/or translate the UUID, GUID, and/or other common ID to a user ID used by one or more DSPs, DMPs, and/or other advertisers at block 208. In some embodiments, the system can be configured to utilize a graph data structure to translate the first-party user ID, UUID, GUID, other common ID, CDN user ID, and/or SSP engine user ID to and/or from one or more user IDs used by individual DSPs, DMPs, and/or other advertisers. An example of such graph data structure or graph translation map is provided in FIG. 4.

In some embodiments, as an asynchronous process to the webpage content retrieval, the system can be configured to conduct an RTB auction or other advertisement selection process at block 266 for filling in one or more impression opportunities on the webpage. For example, in certain embodiments, the SSP engine can be configured to conduct an RTB auction or other advertisement selection process for one or more impression opportunities on the webpage at block 266.

As such, one or more webpage content retrieval processes and/or advertisement selection processes can be performed asynchronously in time and also by separate system entities, in which the browser renders the webpage content while the SSP engine initiates the RTB or other advertisement selection process. Thus, latency in rendering the webpage can be reduced by not having to wait for determination of one or more advertisements to be placed on the webpage and also by reducing the necessary processing power of the user access point system in rendering the page, as the RTB or advertisement selection process or syncing may no longer be performed in the browser. As such, a user can be able to view the whole webpage content almost immediately after requesting the same and/or without any latency arising from having to wait for the RTB or other advertisement selection process.

In some embodiments, in conducting the RTB auction or other advertisement selection process, the SSP engine, based on received and/or retrieved one or more user IDs used by individual DSPs and/or other advertisers, can be configured to update and/or maintain a user ID translation table and/or translate one or more user IDs. Thus, by providing the identity service as a function of the SSP engine, cookie syncing or user ID syncing can be prevented as individual DSPs may no longer have any reason and/or opportunity to be on the webpage to place a pixel or the like, thereby further reducing latency by removing one or more syncing processes and also prevent data leakage.

In response to the SSP engine conducting the RTB auction and/or other bidding scheme, one or more DSPs can be configured to place one or more bids for the one or more impression opportunities at block 268. Once the SSP engine receives the one or more bids from the one or more DSPs, the SSP engine can be configured to determine and/or transmit the one or more winning creatives at block 270 to the CDN. In certain embodiments, the SSP engine is further configured to determine one or more winning advertisement creatives that conform to the requirements to the one or more ad impression opportunities at block 270. For example, the SSP engine can be configured to determine that a particular creative for a winning advertiser comprises one or more dimensions and/or other features or characteristics, such as text or an image(s), that are required for placement in one or more impression opportunities or advertisement slots on the webpage. As such, in some embodiments, the system can be configured to match one or more advertisement creative elements or components with one or more advertisement slots or impression opportunities.

In some embodiments, the CDN can be configured to deliver the one or more winning advertisement creatives at block 272 to fill in the one or more advertisement slots on the webpage. For example, in some embodiments, the CDN can be configured to deliver the one or more winning advertisement creatives as raw data and/or native content, such as image files, text files, and/or video files, as opposed to delivering JavaScript. By delivering raw data or native content for the one or more winning advertisement creatives, the system can further prevent any opportunity by one or more other DSPs, SSPs, and/or advertisers from performing cookie syncing and/or user ID syncing, thereby further reducing any unnecessary processing by the user access point system and/or also further mitigating risk of data leakage through syncing. In some embodiments, the CDN can be configured to receive raw data of one or more winning advertisement creatives from one or more advertisers or one or more DSPs, for example from an advertisement server of the like, which can be delivered or transmitted to the user access point system as raw data or native content. In certain embodiments, the CDN can be configured to receive JavaScript for retrieving one or more winning advertisement creatives from one or more advertisers or one or more DSPs, for example from an advertisement server or the like, as the one or more advertisers or one or more DSPs can be configured to provide or transmit JavaScript. Such JavaScript can then be used by the CDN, in certain embodiments, to retrieve one or more advertisement creatives in raw data format and provide the same to the user access point system. As such, in some embodiments, the CDN can be configured to translate JavaScript corresponding to an advertisement creative to native content or raw data of the advertisement creative for delivery to the user access point system. In other embodiments, the CDN can be configured to deliver the one or more winning advertisement creatives as JavaScript, which can allow the advertisement creative to be retrieved from an advertisement server of the advertiser.

Once the CDN delivers the one or more winning advertisement creatives, the user access point system can be configured to fill in the one or more advertisement slots on the webpage with the one or more winning advertisement creatives at block 274. More specifically, in embodiments in which a white space was previously rendered for one or more advertisement slots on the webpage, the user access point system can be configured to fill in the one or more white spaces with the one or more winning advertisement creatives without re-rendering the whole page. In other embodiments in which an expanding or expandable block or slot was previously rendered for one or more advertisement slots on the webpage, the user access point system can be configured to re-render the full webpage. Embodiments in which one or more expanding blocks were placed in the one or more advertisement slots may be slower than other embodiments in which one or more white block spaces were placed instead, as the web browser or other process running on the user access point system may need to re-render the whole page. On the other hand, however, by providing one or more expanding or expandable blocks or slots in spaces where one or more advertisement slots are present on a webpage, a full webpage without any white space or other distraction can be provided to the user while the advertisement selection process is being performed.

As such, from a user's point of view, the user can be able to view the whole webpage content without having to wait for the system to determine which advertisements to place on the webpage. Rather, the user can view the whole webpage content immediately and/or without substantial latency after requesting the webpage. In other words, after the webpage has already been rendered or at least a portion of the webpage content has already been rendered, the system can be configured to asynchronously determine one or more ads to place on the webpage at the SSP engine level rather than at the browser or user access point system level. As such, in some embodiments described herein, the system can be said to conduct SSP bidding rather than header bidding. In other words, while the user is already enjoying the webpage content, determination and/or bidding for one or more advertisements to be placed on the webpage can be conducted elsewhere separately and/or in parallel at a location that is separate and/or distinct from the browser, such as at the CDN and/or SSP.

Asynchronous Advertisement Selection and/or Insertion for User-Requested Content Any and all processes described above in relation to rendering a user-requested webpage can also be applicable to other user-requested content as well, as such video, audio, virtual reality (VR), augmented reality (AR), and/or other content. In particular, as with webpage content, in some embodiments, retrieval and/or rendering of other user-requested content can be performed in parallel with asynchronous selection and/or bidding of advertisements in other formats, such as video, audio, VR, AR, or the like. Further, in certain embodiments, video, audio, VR, and/or AR advertisements can also be delivered as native content and/or as JavaScript to be embedded in video, audio, VR, and/or AR user-requested content. In addition, in certain embodiments, bidding and/or selection of video, audio, VR, and/or AR advertisements can be initiated at a location separate from the user access point system, such as at a CDN level and/or at a SSP engine level. Moreover, in some embodiments, selection and/or insertion of video, audio, VR, and/or AR advertisements can be conducted without any cookie syncing or user ID syncing, thereby preventing data leakage and/or further reducing latency of delivering the user-requested content.

Figure 3A:
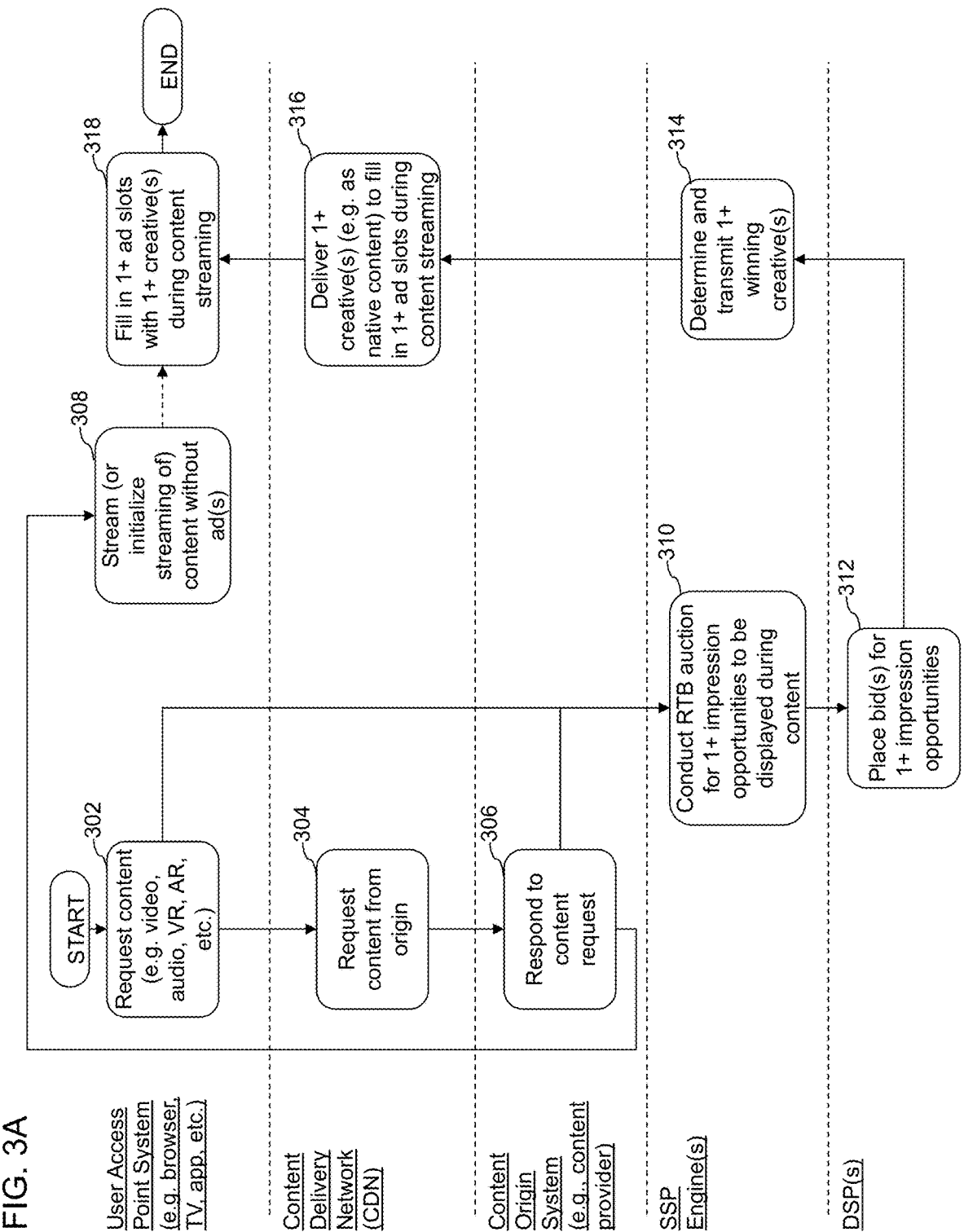
FIG. 3A is a flowchart illustrating an example embodiment(s) of asynchronous advertisement selection and/or insertion for user-requested content.

More specifically, FIG. 3A is a flowchart illustrating an example embodiment(s) of asynchronous advertisement selection and/or insertion for user-requested content. For example, one or more winning video, audio, AR, and/or VR advertisements can be inserted into user-requested video, audio, AR, and/or VR content utilizing one or more processes described in FIG. 3A.

As illustrated in FIG. 3A, in some embodiments, a user access point system can request a particular user-requested content, such as video, audio, AR, and/or VR content, to be rendered at block 302. For example, a web browser, a mobile application or app, a TV browser or other TV app, and/or the like running on a user access point system can request a user-requested content to be delivered. In certain embodiments, the request from the user access point system can be transmitted directly to a content origin system or content provider, such as a publisher of the user-requested content. The content origin system, in some embodiments, can relay the request to a CDN for delivering the content. In other embodiments, the content request from the user access point system can be directly transmitted to the CDN. In either embodiment, the CDN can request the content from the content origin system at block 304. In certain embodiments, the content origin system can respond to the content request at block 306.

Subsequently, in certain embodiments, the user access point system can be configured to stream or at least initialize streaming of the content without any embedded advertisements at block 308, while the advertisement selection process can be initiated and/or performed asynchronously and/or at a separate location outside of the user access point system, such as at the CDN level and/or SSP engine level. Thus, latency in streaming the user-requested content or at least initiating streaming of the user-requested content can be reduced by not having to wait for determination of one or more advertisements to be placed in the content and also by reducing the necessary processing power of the user access point system in initiating streaming of the content, as the RTB or advertisement selection process or syncing may not be performed on the user access point system. As such, a user can be able to at least begin enjoying the user-requested content almost immediately after requesting the same and/or without any latency arising from having to wait for the RTB or other advertisement selection process.

In some embodiments, as an asynchronous process to the content retrieval, the system can be configured to conduct an RTB auction or other advertisement selection process at block 310 for filling in one or more impression opportunities or advertisement slots within the user-requested content. For example, in certain embodiments, the SSP engine and/or CDN can be configured to conduct an RTB auction or other advertisement selection process for one or more impression opportunities in the user-requested content at block 310. In certain embodiments, the SSP can be embedded in the CDN and/or be configured to work in collaboration with the CDN. As such, in some embodiments, the user is already viewing, listening, and/or otherwise enjoying the content, while an RTB auction and/or other advertisement selection process is being performed at a separate location and/or asynchronously.

In response to the SSP engine and/or CDN conducting the RTB auction and/or other advertisement selection process, one or more DSPs can be configured to place one or more bids for the one or more impression opportunities at block 312. Once the SSP engine receives the one or more bids from the one or more DSPs, the SSP engine can be configured to determine and/or transmit the one or more winning creatives at block 314 to the CDN. In certain embodiments, the SSP engine is further configured to determine one or more winning advertisement creatives that conform to the requirements to the one or more ad impression opportunities at block 314. For example, the SSP engine can be configured to determine that a particular creative for a winning advertiser comprises one or more time lengths, bitrates, format, and/or other features or characteristics that are required for placement in one or more impression opportunities or advertisement slots in the user-requested content. As such, in some embodiments, the system can be configured to match and/or ensure that a correctly rendered video advertisement is selected and/or inserted into the user-requested video content.

In some embodiments, the CDN can be configured to deliver the one or more winning advertisement creatives at block 316 to fill in the one or more advertisement slots in the content. For example, in some embodiments, the CDN can be configured to deliver the one or more winning advertisement creatives as raw data and/or native content, such as video files, audio files, VR files, and/or AR files, as opposed to delivering JavaScript. By delivering raw data or native content for the one or more winning advertisement creatives, the system can prevent any opportunity by one or more other DSPs, SSPs, and/or advertisers from performing cookie syncing and/or user ID syncing, thereby further reducing any unnecessary processing by the user access point system and/or also further preventing risks of data leakage through syncing. In some embodiments, the CDN can be configured to receive raw data of one or more winning advertisement creatives from one or more advertisers or one or more DSPs, for example from an advertisement server of the like, which can be delivered or transmitted to the user access point system as raw data or native content. In certain embodiments, the CDN can be configured to receive JavaScript for retrieving one or more winning advertisement creatives from one or more advertisers or one or more DSPs, for example from an advertisement server or the like, as the one or more advertisers or one or more DSPs can be configured to provide JavaScript. Such JavaScript can then be used by the CDN, in certain embodiments, to retrieve one or more advertisement creatives in raw data format and provide the same to the user access point system. As such, in some embodiments, the CDN can be configured to translate JavaScript corresponding to an advertisement creative to native content or raw data of the advertisement creative for delivery to the user access point system. In other embodiments, the CDN can be configured to deliver the one or more winning advertisement creatives as JavaScript, which can allow the advertisement creative to be retrieved from an advertisement server of the advertiser.

Once the CDN delivers the one or more winning advertisement creatives, the user access point system can be configured to fill in the one or more advertisement slots within the user-requested content with the one or more winning advertisement creatives at block 318. For example, in certain embodiments, the CDN can be configured to fill in one or more advertisement slots during a video stream, audio stream, AR stream, and/or VR stream of the user-requested content. In some embodiments, the one or more winning advertisement creatives can be delivered to the user access point system and/or inserted into one or more advertisement slots within the user-requested content as a static asset, video asset, audio asset, AR asset, and/or V/R asset.

As such, in some embodiments, the user is able to start enjoying the requested content even before the system determines which advertisement creatives to place within one or more advertisement slots during streaming of the requested content. In certain embodiments, the user can start enjoying the user-requested content immediately and/or without substantial latency after requesting the content. In other words, after streaming of the user-requested content has already begun or at least a portion thereof has already begun, the system can be configured to asynchronously determine one or more ads to place during the content at certain intervals at the SSP engine level and/or CDN level rather than at the user access point system level. As such, in some embodiments described herein, the system can be said to conduct SSP bidding or CDN bidding rather than header bidding. In other words, while the user is already enjoying the user-requested content, determination and/or bidding for one or more advertisements to be placed during the content can be conducted elsewhere separately and/or in parallel at a location that is separate and/or distinct from the browser, such as at the CDN and/or SSP. In other words, in some embodiments, the system can be configured to minimize and/or at least decrease latency for content delivery that can arise from determining which advertisements to be placed within one or more ad slots of the content that is to be streamed.

FIG. 3B is a flowchart illustrating another example embodiment(s) of asynchronous advertisement selection and/or insertion for user-requested content. More specifically, as illustrated in FIG. 3B, in some embodiments, rather than the user access point system inserting the one or more winning advertisement creatives into the user-requested content, in certain embodiments, the CDN can be configured to embed one or more winning advertisement creatives into the steam of user-requested content, for example as a "streaming embed." As such, in certain embodiments, the user access point system can be configured to provide a smooth, full stream of content, in which one or more advertisements have already been fully embedded into the stream, thereby further eliminating any opportunity for a third-party advertising entity, such as a DSP, DMP, ad walker, or other advertiser, to access the streaming data.

Similar to FIG. 3A, as illustrated in FIG. 3B, in some embodiments, a user access point system can request a particular user-requested content, such as video, audio, AR, and/or VR content, to be rendered at block 352. For example, a web browser, a mobile application or app, a TV browser or other TV app, and/or the like running on a user access point system can request a user-requested content to be delivered, such as for example as over-the-top (OTT) content among others. As such, in certain embodiments, the system can be configured to provide targeted and/or personalized advertisements to be selected and/or delivered for video and/or television content, rather than a broadcast of untargeted advertisements. Further, in some embodiments, the system can be configured to provide a plurality of different targeted and/or personalized advertisements during streaming of a single user-requested content, rather than delivering the same advertisement multiple times. In certain embodiments, the request from the user access point system can be transmitted directly to a content origin system or content provider, such as a publisher of the user-requested content. The content origin system, in some embodiments, can relay the request to a CDN for delivering the content. In other embodiments, the content request from the user access point system can be directly transmitted to the CDN. In either embodiment, the CDN can request the content from the content origin system at block 354. In certain embodiments, the content origin system can respond to the content request at block 356.

Subsequently, in certain embodiments, the user access point system can be configured to stream or at least initialize streaming of the content without any embedded advertisements at block 358, while the advertisement selection process can be initiated and/or performed asynchronously and/ or at a separate location outside of the user access point system, such as at the CDN level and/or SSP engine level. Thus, latency in streaming the user-requested content or at least initiating streaming of the user-requested content can be reduced by not having to wait for determination of one or more advertisements to be placed in the content and also by reducing the necessary processing power of the user access point system in initiating streaming of the content, as the RTB or advertisement selection process or syncing may not be performed on the user access point system. As such, a user can be able to at least begin enjoying the user-requested content almost immediately after requesting the same and/or without any latency arising from having to wait for the RTB or other advertisement selection process.

In some embodiments, as an asynchronous process to the content retrieval, the system can be configured to conduct an RTB auction or other advertisement selection process at block 360 for filling in one or more impression opportunities within the user-requested content. For example, in certain embodiments, the SSP engine and/or CDN can be configured to conduct an RTB auction or other advertisement selection process for one or more impression opportunities in the user-requested content at block 360. In certain embodiments, the SSP can be embedded in the CDN and/or be configured to work in collaboration with the CDN. As such, in some embodiments, the user is already viewing, listening, and/or otherwise enjoying the content, while a RTB auction and/or other advertisement selection process is being performed at a separate location and/or asynchronously.

In response to the SSP engine and/or CDN conducting the RTB auction and/or other advertisement selection process, one or more DSPs can be configured to place one or more bids for the one or more impression opportunities at block 362. Once the SSP engine receives the one or more bids from the one or more DSPs, the SSP engine can be configured to determine and/or transmit the one or more winning creatives at block 364 to the CDN. In certain embodiments, the SSP engine is further configured to determine one or more winning advertisement creatives that conform to the requirements to the one or more ad impression opportunities at block 364. For example, the SSP engine can be configured to determine that a particular creative for a winning advertiser comprises one or more time lengths, bitrates, format, and/or other features or characteristics that are required for placement in one or more impression opportunities or advertisement slots in the user-requested content. As such, in some embodiments, the system can be configured to match and/or ensure that a correctly rendered video advertisement is selected and/or inserted into the user-requested video content.

In some embodiments, the CDN can be configured to directly embed the one or more winning advertisement creatives at block 366 into the user-requested content to fill in one or more advertisement slots. For example, in some embodiments, the CDN can be configured to embed or stitch-in raw data, such as video files, audio files, VR files, and/or AR files, of one or more winning advertisement creatives into the stream of user-requested content. In some embodiments, the CDN can be configured to receive raw data of one or more winning advertisement creatives from one or more advertisers or one or more DSPs, for example from an advertisement server of the like, which can be stitched in to the user-requested content prior to delivery to the user access point system. In certain embodiments, the CDN can be configured to receive JavaScript for retrieving one or more winning advertisement creatives from one or more advertisers or one or more DSPs, for example from an advertisement server or the like, as the one or more advertisers or one or more DSPs can be configured to provide JavaScript. Such JavaScript can then be used by the CDN, in certain embodiments, to retrieve one or more advertisement creatives in raw data format, which can further be stitched into the user-requested content by the CDN for delivery to the user access point system. As such, in some embodiments, the CDN can be configured to translate JavaScript corresponding to an advertisement creative to native content or raw data of the advertisement creative for stitching in or embedding into the user-requested content for delivery to the user access point system. As such, compared to the embodiment(s) illustrated in FIG. 3A, in some embodiments as such illustrated in FIG. 3B, the user access point system can simply receive a full stream of content in which one or more advertisements have already been embedded or stitched in by the CDN. As such, in such embodiments, the user access point system does not need to embed the one or more winning advertisement creatives into the streaming content itself, thereby further reducing processing requirements of the user access point system and providing a more streamlined experience to the user.

Graphical User Identifier Data Structure

As described above, in some embodiments, the system can be configured to provide one or more identity services. In certain embodiments, the identity service can be performed at an SSP, and/or CDN, and/or any other advertisement service provider. The identity service can be configured to be performed with or without a universal user ID, such as a UUID or GUID, or other common user ID.

In certain embodiments, as described above, by providing user identity services at the CDN and/or SSP level, the system can be configured not to require and/or prevent cookie syncing or user ID syncing among one or more advertisement service providing entities, such as DSPs, SSPs, advertisers, publishers, or the like. Rather, the user identity service at the CDN and/or SSP level can translate a universal user ID, such as a GUID or UUID, other common user ID, or a user ID used by one entity to a user ID used by another entity.

Figure 4:
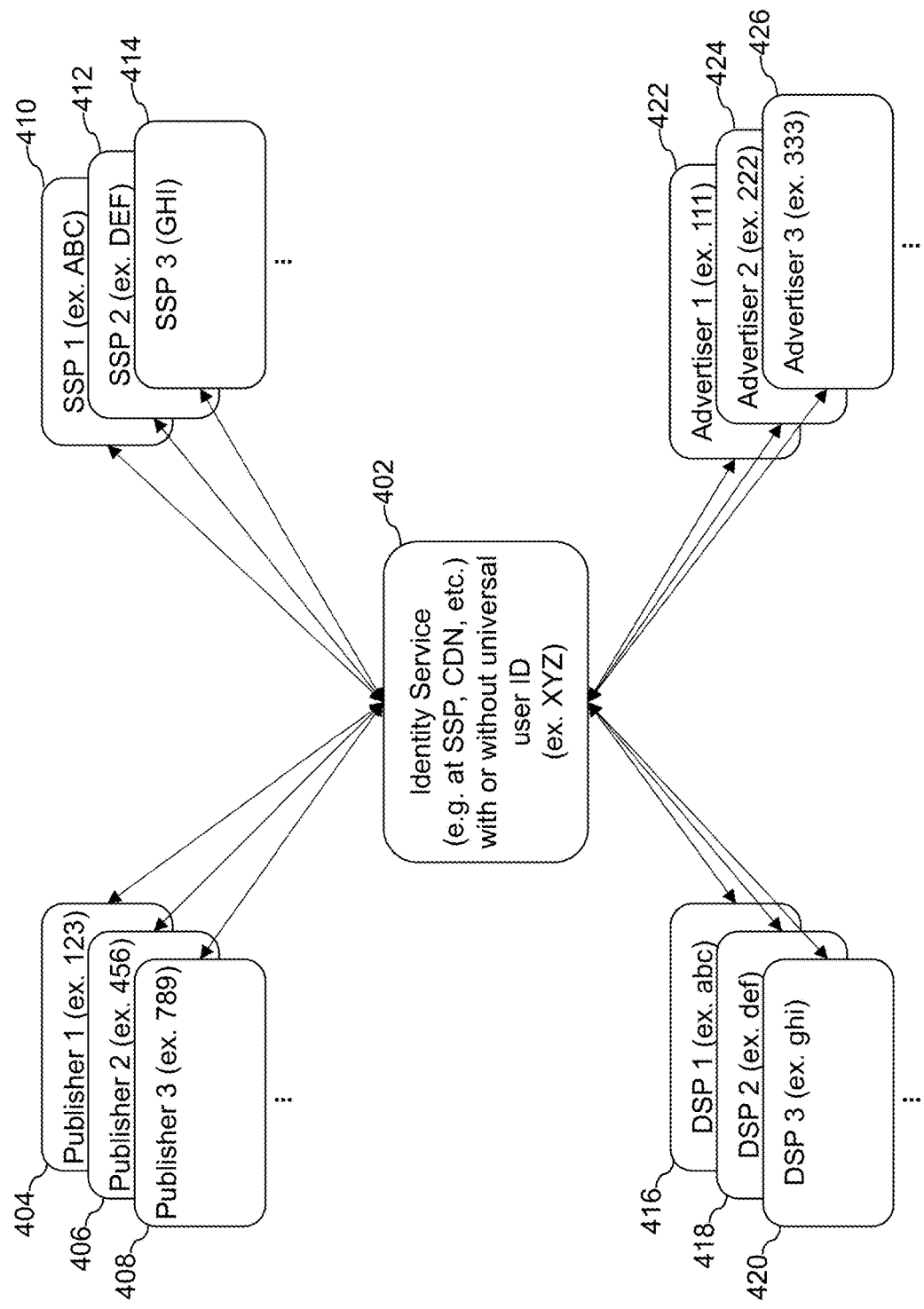
FIG. 4 is a schematic diagram illustrating an example embodiment(s) of a graphical user identifier data structure.

In some embodiments, in order to provide such identity services and/or translation services, the system can be configured to utilize a graphical user identifier data structure, as opposed to a one-to-one matching table that can be used in certain header bidding embodiments. FIG. 4 is a schematic diagram illustrating an example embodiment(s) of a graphical user identifier data structure.

As illustrated in FIG. 4, in some embodiments, one or more publishers 404, 406, 408 can utilize their own user ID for a particular user, while one or more advertisers 422, 424, 426 can utilize their own user ID for the same user. Similarly, one or more SSPs 410, 412, 414 can also each have their own user ID for the same user, while one or more DSPs 416, 418, 420 can also have one or more unique user IDs for the same user.

Rather than utilizing a one-to-one matching table, in some embodiments, the system can be configured to provide an identity service 402 that matches and/or links such unique IDs across one or more publishers, SSPs, DMPs, DSPs, and/or advertisers through a graph-like and/or node-like database or data structure. As such, a direct translation from one user ID to another user ID can be mapped and/or made available. Further, in certain embodiments, the system can be configured to determine and/or provide a direct translation path between user IDs used by one or more publishers, SSPs, DMPs, DSPs, and/or advertisers through a graph-like and/or node-like database or data structure.

In certain embodiments, the identity service 402 can have its own universal user ID for a particular user, such as a UUID or GUID or other common ID. However, in some embodiments, the identity service 402 can be configured not to reveal the universal user ID to any other advertisement service provider for security and/or privacy reasons. Rather, the identity service 402 can simply translate a particular user ID for one advertisement service provider to another service provider.

System

Figure 5A:
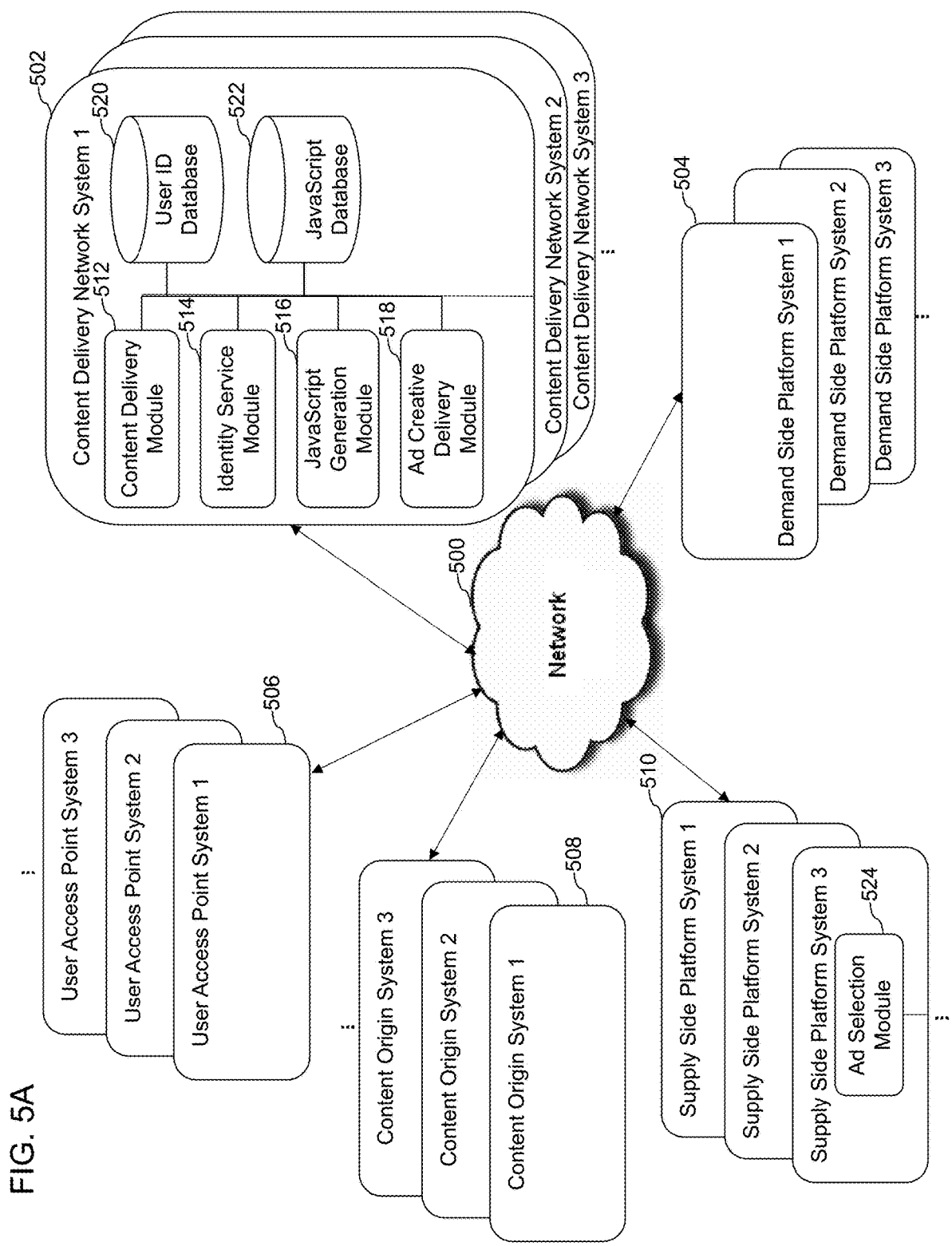
FIG. 5A is a schematic diagram illustrating an example embodiment(s) of a system for decreasing latency and/or preventing data leakage due to advertisement insertion.

FIG. 5A is a schematic diagram illustrating an example embodiment(s) of a system for decreasing latency and/or preventing data leakage due to advertisement insertion. In some embodiments, the system can comprise one or CDNs 502, one or more DSPs 504, one or more user access point systems 506, one or more content origin systems 508, and/or one or more SSPs 510. The one or more CDNs 502, one or more DSPs 504, one or more user access point systems 506, one or more content origin systems 508, and/or one or more SSPs 510 can be connected to network 500 and/or to one another through the network 500.

In some embodiments, the one or more CDNs 502 may each comprise a content delivery module 512, an identity service module 514, a JavaScript generation module 516, and/or an advertisement creative delivery module 518. In certain embodiments, the one or more CDNs 502 may also comprise a user ID database 520 and/or a JavaScript database 522.

The content delivery module 512 may function by delivering user-requested content from a content origin system 508 to a user access point system 506. The identity service module 514 may function by performing one or more of identification, retrieval, generation, and/or translation of one or more user IDs as described above. The JavaScript generation module 516 may function by performing one or more of generation and/or injection of one or more JavaScript tags as described above. The advertisement creative delivery module 518 delivering one or more winning advertisement creatives to a user access point system 506, for example from an advertisement server of an advertiser. The user ID database 520 may provide a collection of any and/or all user IDs that the CDN is aware of, for example through performing one or more identity services as described above. The JavaScript database 522 may provide a collection of any and/or all JavaScript tags that have been generated and/or utilized as described above.

In some embodiments, the one or more SSPs 510 may each comprise an advertisement selection module 524. The advertisement selection module 524 may function by conducting an advertisement selection process, such as an RTB auction or other process for selecting one or more advertisement creatives for placement in one or more impression opportunities as described above.

Figure 5B:
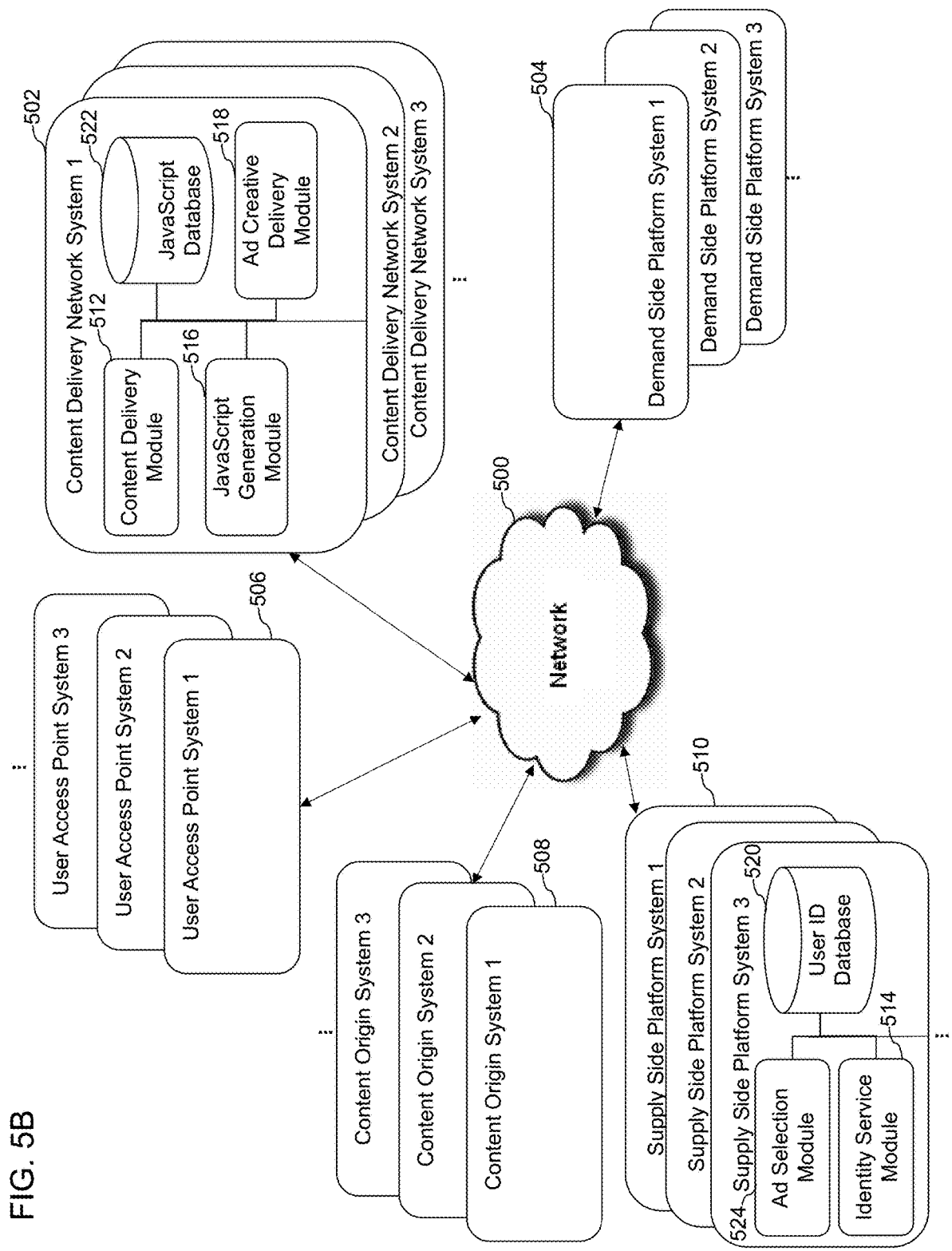
FIG. 5B is a schematic diagram illustrating another example embodiment(s) of a system for decreasing latency and/or preventing data leakage due to advertisement insertion.

FIG. 5B is a schematic diagram illustrating another example embodiment(s) of a system for decreasing latency and/or preventing data leakage due to advertisement insertion. Similar to FIG. 5A, in some embodiments, the system can comprise one or CDNs 502, one or more DSPs 504, one or more user access point systems 506, one or more content origin systems 508, and/or one or more SSPs 510. The one or more CDNs 502, one or more DSPs 504, one or more user access point systems 506, one or more content origin systems 508, and/or one or more SSPs 510 can be connected to network 500 and/or to one another through the network 500.

However, contrary to the embodiment(s) illustrated in FIG. 5A, in some embodiments, the advertisement selection module 514 and/or user ID database 520 may reside on one or more SSPs 510 rather than on a CDN 502. For example, in certain embodiments, the one or more SSPs 510 may each comprise an advertisement selection module 524, identity service module 514, and/or a user ID database 520. Further, the one or more CDNs 502 may each comprise a content delivery module 512, a JavaScript generation module 516, a JavaScript database 522, and/or an advertisement creative delivery module 518. Each module and/or database with the same reference number may perform the same or similar functions as described above in relation to FIG. 5A.

Computer System

Figure 6:
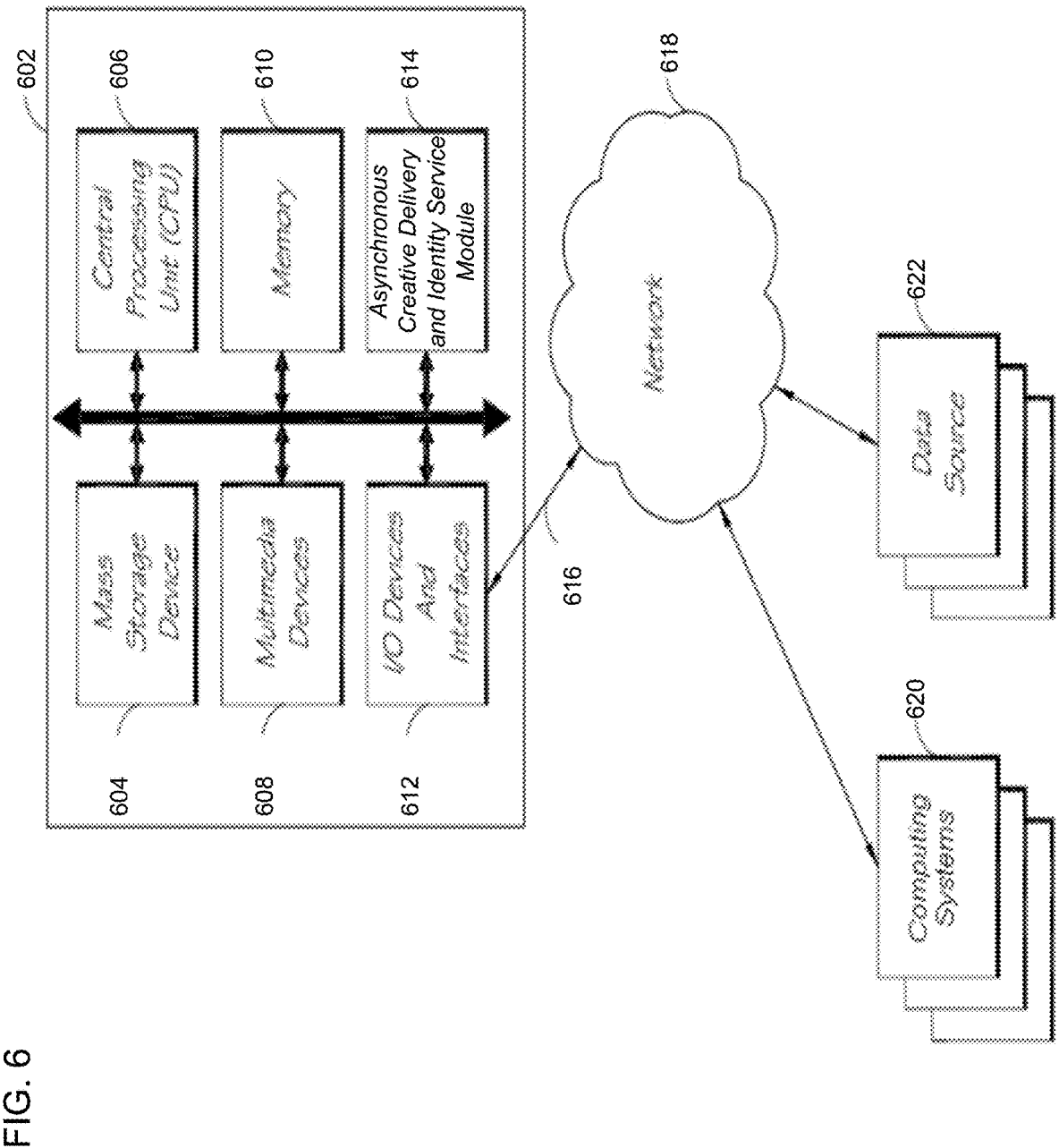
FIG. 6 is a block diagram depicting an embodiment(s) of a computer hardware system configured to run software for implementing one or more embodiments of systems, devices, and methods for decreasing latency and/or preventing data leakage due to advertisement insertion.

In some embodiments, the systems, processes, and methods described herein are implemented using a computing system, such as the one illustrated in FIG. 6. The example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

The computer system 602 can comprise an asynchronous creative delivery and identity service module 614 that carries out the functions, methods, acts, and/or processes described herein. The asynchronous creative delivery and identity service module 614 is executed on the computer system 602 by a central processing unit 606 discussed further below.

In general the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 602 includes one or more processing units (CPU) 606, which may comprise a microprocessor. The computer system 602 further includes a physical memory 610, such as random access memory (RAM) for temporary storage of information, a read only memory (ROM) for permanent storage of information, and a mass storage device 604, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 602 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 612, such as a keyboard, mouse, touch pad, and printer. The I/O devices and interfaces 612 can include one or more display devices, such as a monitor, that allows the visual presentation of data to a user. More particularly, a display device provides for the presentation of GUIs as application software data, and multi-media presentations, for example. The I/O devices and interfaces 612 can also provide a communications interface to various external devices. The computer system 602 may comprise one or more multi-media devices 608, such as speakers, video cards, graphics accelerators, and microphones, for example.

The computer system 602 may run on a variety of computing devices, such as a server, a Windows server, a Structure Query Language server, a Unix Server, a personal computer, a laptop computer, and so forth. In other embodiments, the computer system 602 may run on a cluster computer system, a mainframe computer system and/or other computing system suitable for controlling and/or communicating with large databases, performing high volume transaction processing, and generating reports from large databases. The computing system 602 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 602 illustrated in FIG. 6 is coupled to a network 618, such as a LAN, WAN, or the Internet via a communication link 616 (wired, wireless, or a combination thereof). Network 618 communicates with various computing devices and/or other electronic devices. Network 618 is communicating with one or more computing systems 620 and one or more data sources 622. The asynchronous creative delivery and identity service module 614 may access or may be accessed by computing systems 620 and/or data sources 622 through a web-enabled user access point. Connections may be a direct physical connection, a virtual connection, and other connection type. The web-enabled user access point may comprise a browser module that uses text, graphics, audio, video, and other media to present data and to allow interaction with data via the network 618.

Access to the asynchronous creative delivery and identity service module 614 of the computer system 602 by computing systems 620 and/or by data sources 622 may be through a web-enabled user access point such as the computing systems' 620 or data source's 622 personal computer, cellular phone, smartphone, laptop, tablet computer, e-reader device, audio player, or other device capable of connecting to the network 618. Such a device may have a browser module that is implemented as a module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 612 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 602 may comprise a physical or logical connection established between a remote microprocessor and a mainframe host computer for the express purpose of uploading, downloading, or viewing interactive data and databases on-line in real time. The remote microprocessor may be operated by an entity operating the computer system 602, including the client server systems or the main server system, and/or may be operated by one or more of the data sources 622 and/or one or more of the computing systems 620. In some embodiments, terminal emulation software may be used on the microprocessor for participating in the micro-mainframe link.

In some embodiments, computing systems 620 who are internal to an entity operating the computer system 602 may access the asynchronous creative delivery and identity service module 614 internally as an application or process run by the CPU 606.

The computing system 602 may include one or more internal and/or external data sources (for example, data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 may also access one or more databases 622. The databases 622 may be stored in a database or data repository. The computer system 602 may access the one or more databases 622 through a network 618 or may directly access the database or data repository through I/O devices and interfaces 612. The data repository storing the one or more databases 622 may reside within the computer system 602.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for web sites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A system for reducing latency in rendering user-requested content on a user access point system and reducing risk of leakage of user information, the system comprising:
    one or more computer readable storage devices configured to store a plurality of computer executable instructions; and
    one or more hardware computer processors in communication with the one or more computer readable storage devices and configured to execute the plurality of computer executable instructions in order to cause the system to:
        receive a request from a user access point system to transmit user-requested content to the user access point system;
        initiate transmission of the user-requested content to the user access point system, wherein the user-requested content comprises a webpage, wherein the user-requested content comprises a webpage, wherein the user-requested content comprises one or more placeholders for one or more user-targeted advertisements, thereby allowing the user access point system to render the user-requested content without the one or more user-targeted advertisements, wherein each of the one or more placeholders comprises one or more of an expandable block or a white space;
        initiate an advertisement selection process for determining one or more user-targeted advertisements for placement in the user-requested content, wherein the advertisement selection process is processed asynchronously to the transmission of the user-requested content, wherein the advertisement selection process is initiated and processed wholly outside of the user access point system, wherein initiating and processing the advertisement selection process wholly outside of the user access point system prevents access to the user access point system by advertisers to conduct header bidding, wherein initiating the advertisement selection process comprises:
            retrieving or generating, by the system, a common user identifier for a user of the user access point system;
            embedding the common user identifier into a request to conduct the advertisement selection process; and
            transmitting the request to a supply-side platform for conducting the advertisement selection process, wherein the supply-side platform is configured to utilize the common user identifier in conducting the advertisement selection process, wherein utilizing the common user identifier further prevents access to the user access point system by advertisers to conduct cookie syncing,
        wherein the supply-side platform is further configured to translate the common user identifier to one or more other user identifiers, wherein the one or more other user identifiers are used by one or more advertisers and/or one or more demand side platforms, wherein the translation of the common user identifier to the one or more other user identifiers is performed by utilizing a graph data structure comprising the common user identifier and the one or more other user identifiers;
        receive, from the supply-side platform, a selection of the determined one or more user-targeted advertisements for placement in the user-requested content; and
        transmit, to the user access point system, the determined one or more user-targeted advertisements as native content, wherein transmission of the determined one or more user-targeted advertisements causes placement of the determined one or more user-targeted advertisements in the one or more placeholders of the user-requested content subsequent to transmission of the user-requested content, wherein placement of the determined one or more user-targeted advertisements subsequent to transmission of the user-requested content reduces latency in rendering the user-requested content on the user access point system,
        wherein the system is separate from the user access point system.

2. The system of claim 1, wherein the user-requested content comprises video and/or audio content.

3. The system of claim 1, wherein the system is further caused to retrieve the one or more user-targeted advertisements based at least in part on JavaScript and translate the one or more user-targeted advertisements into native content for transmission to the user access point system.

4. The system of claim 1, wherein the system is further caused to receive the one or more user-targeted advertisements from an advertisement server as native content for transmission to the user access point system.

5. The system of claim 1, wherein the system is further caused to generate and inject JavaScript into the user-requested content, wherein the JavaScript comprises the common user identifier.

6. The system of claim 1, wherein the system is configured not to inject any JavaScript into the user-requested content.

7. The system of claim 1, wherein the system comprises a content delivery network.

8. The system of claim 1, wherein the system comprises the supply side platform.

9. The system of claim 1, wherein the advertisement selection process comprises a real-time bidding auction.

10. A computer-implemented method for reducing latency in rendering user-requested content on a user access point system and reducing risk of leakage of user information, the method comprising:
    receiving, by a computer system, a request from a user access point system to transmit user-requested content to the user access point system;

initiating, by the computer system, transmission of the user-requested content to the user access point system, wherein the user-requested content comprises a webpage, wherein the user-requested content comprises one or more placeholders for one or more user-targeted advertisements, thereby allowing the user access point system to render the user-requested content without the one or more user-targeted advertisements, wherein each of the one or more placeholders comprises one or more of an expandable block or a white space;

initiating, by the computer system, an advertisement selection process for determining one or more user-targeted advertisements for placement in the user-requested content, wherein the advertisement selection process is processed asynchronously to the transmission of the user-requested content, wherein the advertisement selection process is initiated and processed wholly outside of the user access point system, wherein initiating and processing the advertisement selection process wholly outside of the user access point system prevents access to the user access point system by advertisers to conduct header bidding, wherein initiating the advertisement selection process comprises:

retrieving or generating a common user identifier for a user of the user access point system;

embedding the common user identifier into a request to conduct the advertisement selection process; and transmitting the request to a supply-side platform for conducting the advertisement selection process, wherein the supply-side platform is configured to utilize the common user identifier in conducting the advertisement selection process, wherein utilizing the common user identifier further prevents access to the user access point system by advertisers to conduct cookie syncing, wherein the supply-side platform is further configured to translate the common user identifier to one or more other user identifiers, wherein the one or more other user identifiers are used by one or more advertisers and/or one or more demand side platforms, wherein the translation of the common user identifier to the one or more other user identifiers is performed by utilizing a graph data structure comprising the common user identifier and the one or more other user identifiers;

receiving, by the computer system from the supply-side platform, a selection of the determined one or more user-targeted advertisements for placement in the user-requested content; and transmitting, by the computer system to the user access point system, the determined one or more user-targeted advertisements as native content, wherein transmission of the determined one or more user-targeted advertisements causes placement of the determined one or more user-targeted advertisements in the one or more placeholders of the user-requested content subsequent to transmission of the user-requested content, wherein placement of the determined one or more user-targeted advertisements subsequent to transmission of the user-requested content reduces latency in rendering the user-requested content on the user access point system, wherein the computer system is separate from the user access point system, and wherein the computer system comprises one or more computers.

11. The computer-implemented method of claim 10, wherein the user-requested content comprises video and/or audio content.

12. The computer-implemented method of claim 10, wherein the computer system comprises a content delivery network.

13. The computer-implemented method of claim 10, wherein the computer system comprises the supply side platform.

14. The computer-implemented method of claim 10, further comprising receiving, by the computer system, the one or more user-targeted advertisements from an advertisement server as native content for transmission to the user access point system.

15. The computer-implemented method of claim 10, further comprising retrieving, by the computer system, the one or more user-targeted advertisements based at least in part on JavaScript and translating the one or more user-targeted advertisements into native content for transmission to the user access point system.

16. The computer-implemented method of claim 10, further comprising generating and injecting, by the computer system, JavaScript into the user-requested content, wherein the JavaScript comprises the common user identifier.

17. The computer-implemented method of claim 10, wherein the advertisement selection process comprises a real-time bidding auction.

* * * * *

UNITED STATES PATENT AND TRADEMARK OFFICE
CERTIFICATE OF CORRECTION

PATENT NO.         : 10,740,795 B2
APPLICATION NO.    : 16/425502
DATED              : August 11, 2020
INVENTOR(S)        : Schobeiri et al.

It is certified that error appears in the above-identified patent and that said Letters Patent is hereby corrected as shown below:

On the Title Page

On Page 3, Column 2, Item (56), Line 37, under Other Publications, delete "(https://www." and insert --https://www.--.

In the Drawings

On Sheet 3 of 9, FIG. 2B, reference numeral 258, Line 4, delete "etc," and insert --etc.--.

In the Specification

In Column 5, Line 42, delete "web site" and insert --website--.

In Column 5, Line 53, delete "web site" and insert --website--.

In Column 6, Line 52, delete "web site" and insert --website--.

In Column 29, Line 9, delete "PYPHON" and insert --PYTHON--.

In Column 31, Line 56, delete "web sites" and insert --websites--.

In Column 31, Line 65, delete "web site)." and insert --website).--.

In the Claims

In Column 33, Lines 40-42, Claim 1, delete "wherein the user-requested content comprises a webpage, wherein the user-requested content comprises a webpage," and insert --wherein the user-requested content comprises a webpage,--.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*